United States Patent
Ku et al.

(10) Patent No.: US 11,023,941 B2
(45) Date of Patent: *Jun. 1, 2021

(54) MANAGING ECOMMERCE MESSAGES VIA A SOCIAL NETWORKING SYSTEM

(71) Applicant: Facebook, Inc., Menlo Park, CA (US)

(72) Inventors: Mary Pao-an Ku, San Jose, CA (US); Anand Subbarayan, Fremont, CA (US); Bowen Pan, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/280,789

(22) Filed: Feb. 20, 2019

(65) Prior Publication Data

US 2019/0180340 A1 Jun. 13, 2019

Related U.S. Application Data

(63) Continuation of application No. 14/688,708, filed on Apr. 16, 2015, now Pat. No. 10,217,152.

(51) Int. Cl.
*G06Q 30/06* (2012.01)
*H04L 12/58* (2006.01)
*G06Q 50/00* (2012.01)

(52) U.S. Cl.
CPC ......... *G06Q 30/0613* (2013.01); *G06Q 50/01* (2013.01); *H04L 51/32* (2013.01)

(58) Field of Classification Search
CPC .................................................. G06G 30/06–08

USPC ................................................ 705/26.1–27.2
See application file for complete search history.

(56) References Cited

U.S. PATENT DOCUMENTS

| | | | |
|---|---|---|---|
| 10,217,152 B2 | 2/2019 | Ku et al. | |
| 2006/0167756 A1 | 7/2006 | VonBergen et al. | |
| 2013/0275264 A1 | 10/2013 | Lindenberg | |
| 2013/0290149 A1 | 10/2013 | Rashwan | |
| 2014/0122297 A1* | 5/2014 | Dunlap | H04W 4/14 705/26.61 |
| 2014/0173011 A1 | 6/2014 | Singh | |
| 2015/0106221 A1 | 4/2015 | Tapley et al. | |
| 2015/0127489 A1* | 5/2015 | Vasthimal | G06Q 30/0625 705/26.62 |
| 2016/0267575 A1* | 9/2016 | Garcia | H04L 67/10 |

(Continued)

OTHER PUBLICATIONS

How to Create Successful Facebook News Feed Ads, Rocco Alberto Baldassarre, Apr. 14, 2014, available at: https://www.socialmediaexaminer.com/facebook-news-feed-ads/ (Year: 2014).*

(Continued)

*Primary Examiner* — Ming Shui
(74) *Attorney, Agent, or Firm* — Keller Jolley Preece

(57) ABSTRACT

The present disclosure is directed toward systems and methods for managing electronic messages via a social networking system. For example, systems and methods described herein involve organizing electronic messages and/or communication threads related to a product offered by sale via the social networking system. Furthermore, systems and methods described herein can generate and send electronic messages that are related to the status of a product that a product seller has advertised for sale via the social networking system.

20 Claims, 16 Drawing Sheets

(56) References Cited

U.S. PATENT DOCUMENTS

2017/0178223 A1* 6/2017 Ranasinghe ....... G06Q 30/0271

OTHER PUBLICATIONS

Social Shopping takes on new meaning with newsfeed purchasing, AdAge, https://adage.com/article/digital/alvenda-lets-consumers-shop-facebook-page/138946, Sep. 14, 2009 (Year: 2009).*
U.S. Appl. No. 14/688,708, Jul. 14, 2016, Office Action.
U.S. Appl. No. 14/688,708, Feb. 2, 2010, Office Action.
U.S. Appl. No. 14/688,708, Jan. 22, 2018, Office Action.
U.S. Appl. No. 14/688,708, Oct. 2, 2018, Notice of Allowance.

* cited by examiner

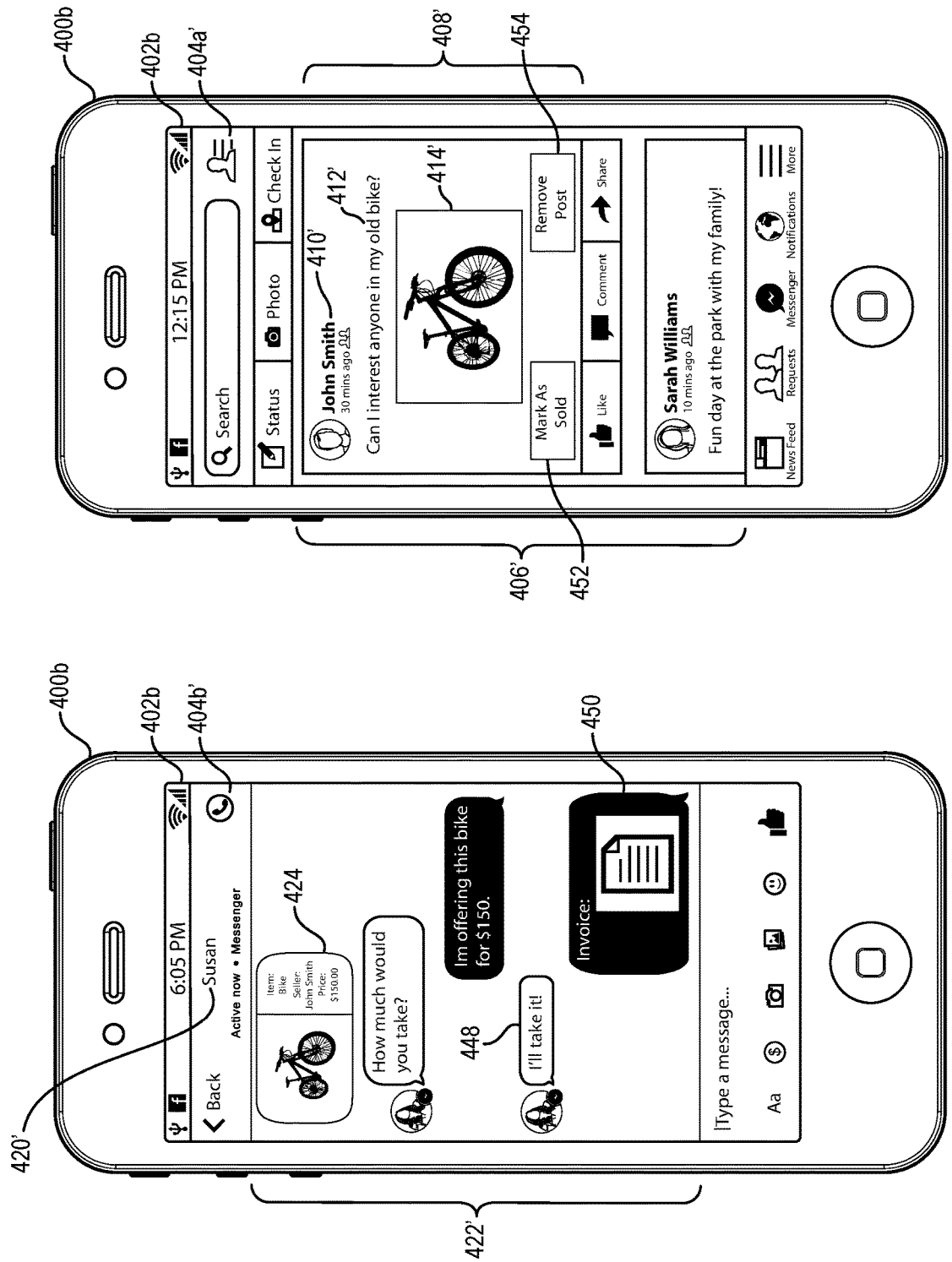

MANAGING ECOMMERCE MESSAGES VIA A SOCIAL NETWORKING SYSTEM

CROSS REFERENCE TO RELATED APPLICATIONS

This application is a continuation of U.S. patent application Ser. No. 14/688,708, filed Apr. 16, 2015, with is incorporated by reference herein for all purposes.

BACKGROUND

1. Technical Field

One or more embodiments relate generally to commerce within a social networking system. More specifically, one or more embodiments relate to managing commerce-related electronic messages between users of a social networking system.

2. Background and Relevant Art

Internet users find it increasingly convenient to research, find, and purchase goods online. eCommerce websites sell a variety of consumer goods ranging from car parts to groceries to electronics. In addition to the countless retail companies that are currently on-line, private sellers can also sell their goods on the Internet. Building and maintaining an ecommerce website, however, is often a daunting and expensive undertaking for many small businesses and private sellers.

Rather than building an ecommerce website of their own, private sellers and small businesses commonly utilize the convenience of a social networking system in order to find and organize groups of buyers and sellers who are interested in the same types of products. In this way, social networking systems serve as a digital marketplace, where users can buy and sell goods. For example, a social networking system may host groups that users can use to buy goods from and sell goods to other group members. Utilizing these social networking groups, buyers and sellers can post new goods for sale, communicate among themselves, and make purchases.

Buyers and sellers may communicate with each other via a social network for a variety of purposes. For example, a potential buyer may have a question about the condition of a product, the advertised price of the product, or whether the seller is willing to accept a lower price. Accordingly, the potential buyer can send one or more messages to a product seller via the social networking system by utilizing the messaging services typically built into the social networking system. A problem arises however, when the product seller is offering multiple products for sale, or is receiving multiple messages regarding the product or products the product seller has offered for sale. In a short amount of time, the product seller may have a message box full of questions about products, but with little contextual information indicating which product each message is referring to.

Additionally, a product seller may have a difficult time updating multiple potential buyers regarding changes or updates to items that are for sale. For example, the product seller may have to individually send an electronic message to each potential buyer to inform the potential buyer of the updated sale details. This process is obviously cumbersome and time consuming. Along the similar lines, if the product seller sells a particular product but fails to delete the original product posting, the product seller may continue to receive message inquiries regarding the product, even though the product has already been sold. This again results in wasted time and frustration for the product seller.

Thus, there are several disadvantages to current methods for managing commerce-related electronic messages via a social networking system.

SUMMARY

One or more embodiments described herein provide benefits and/or solve one or more of the foregoing or other problems in the art with systems and methods for managing commerce-related electronic messages via a social networking system. For example, an embodiment includes systems and methods that pre-populate an electronic message from a potential buyer with structured data related to a product for sale. Thus, when the product seller receives the electronic message from the potential buyer, the electronic message contains enough context for the product seller to easily determine to which product the electronic message relates. An embodiment described herein organizes all additional electronic messages between the product seller and the potential buyer into a communication thread according to the structured data included in the pre-populated electronic message.

Furthermore, one or more embodiments described herein include systems and methods that allow a product seller to quickly and easily broadcast an electronic message to all potential buyers who have communicated with the product seller. For example, one or more embodiments track all communications related to a particular product between the product seller and multiple potential buyers. Accordingly, systems and methods allow the product seller to broadcast a single electronic message to the multiple potential buyers.

Additionally, one or more embodiments described herein include systems and methods that reply to user inquiries related to a product that has been sold without any further input from the seller of the product. For example, in one embodiment, a social media post advertising a particular product may still be viewable even though the product has already been sold. In response to a user sending an electronic message to the product seller regarding the now sold product, one or more embodiments can reply to the electronic message without any input from the product seller. Additionally, one or more embodiments can also reply to all potential buyers who have communicated with the product seller regarding the now sold product, to inform the other potential buyers that the product is no longer available.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIGS. 4A-4H illustrate user interfaces for facilitating communications between a product seller and multiple potential product buyers in accordance with one or more embodiments;

DETAILED DESCRIPTION

Figure 1:
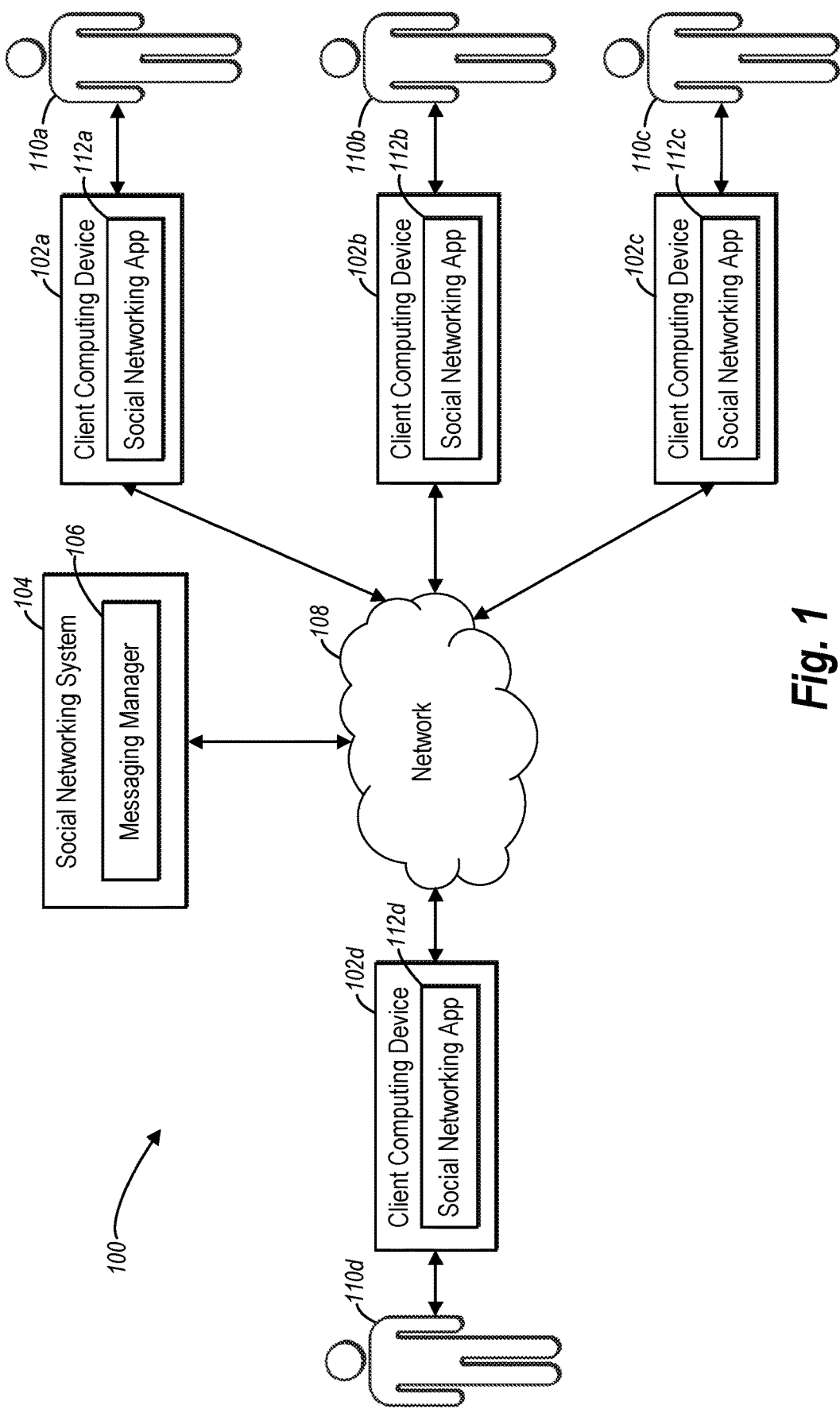
FIG. 1 illustrates a block diagram of an environment for implementing a messaging manager in accordance with one or more embodiments.

One or more embodiments described herein provide benefits and/or solve one or more of the foregoing or other problems in the art with systems and methods for managing electronic messages via a social networking system. For example, a messaging manager of one or more embodiments described herein manages and organizes electronic messages between buyers and sellers via a social networking application. To illustrate, the messaging manager can provide contextual information to a product seller along with a message from a potential buyer. As a result, the product seller can easily determine the product to which the message relates. In one or more embodiments, the messaging manager can create threads of communications between a seller and multiple buyers, and organize those communication threads according to the product discussed within each thread. Thus, when a new electronic message arrives, the seller can easily discern the product to which the electronic message is related.

Furthermore, in at least one embodiment, rather than sending individual messages to multiple potential buyers regarding a particular product, systems and methods described herein allow a seller to broadcast a single electronic message to multiple potential buyers regarding a particular product. For example, as mentioned above, one or more embodiments may include a messaging manager that organizes communication threads between a seller and multiple potential buyers based on the product discussed therein. The messaging manager can also allow the seller to broadcast a single message to each of the multiple potential buyers rather than requiring the seller to send an individual message to each of the multiple potential buyers. In this way, the messaging manager saves the seller time and frustration.

Additionally, in one or more embodiments, the messaging manager can also send an auto-reply to potential buyers in response to inquiries regarding a product that has already been sold. For example, in one embodiment, the original posting for a particular product may still be active, even though that product is no longer available (i.e., the seller has already sold the product). In that embodiment, potential buyers may send electronic messages to the seller of the product without realizing the product is no longer available. Rather than cluttering the seller's inbox with messages that are no longer of any concern, the messaging manager described herein can intercept these messages and reply to them, without any further input from the product seller.

As used herein, the term "social networking system" refers to a system that supports or enables on-line communication, input, interaction, content-sharing, and collaboration between users. A user of the social networking system can have one or more "friends" via the social networking system. As used herein, the term "friend" refers to a co-user associated with a user via the social networking system (i.e., a contact or connection).

In one or more embodiments, a user may send one or more social media posts via the social networking system. As used herein, a "social media post" refers to an electronic communication sent from one user to one or more co-users associated with the user via the social networking system. In one embodiment, a social media post is an electronic communication from a user that the social networking system posts to a newsfeed (i.e., a "wall") associated with every friend of the user. Additionally or alternatively, a social media post can be an electronic communication from a user that the social networking system posts to a newsfeed associated with a particular group or community of social networking system users.

In one or more embodiments, a user may send one or more electronic messages via the social networking system. As used herein, an "electronic message" refers to an electronic communication sent from one user via the social networking system. In one or more embodiments, an electronic message is a private message between only a sender and one recipient. Rather than posting an electronic message to a newsfeed, as described above, the social networking system can deliver the electronic message to a private inbox associated with the recipient. Additionally or alternatively, an electronic message can be a private message between only a sender and a group of recipients. In that case, the social networking system can deliver a copy of the private message to an inbox associated with each member of the group of recipients. Other examples of electronic messages include text messages, instant messages, or any other electronic message.

While a social networking system is predominantly concerned with enabling social networking system communication between users, in one or more embodiments, a social networking system can also enable commercial transactions. For example, in one embodiment, a social networking system can support groups or communities of users who are interested in the purchase and/or sale of various types of goods. For instance, a social networking system group may be dedicated to the purchase and sale of classic car parts. By utilizing various features of the social networking system, the members of the classic car parts group can communicate with each other about parts for sale, prices, locations, etc., and eventually arrange for the sale and purchase of the parts. In one embodiment, the social networking system can include payment features that allow for a group member to fund the transaction and complete the sale.

In one or more embodiments described herein, a product seller may utilize the social networking system to facilitate the advertising and sale of the product. For example, in one embodiment, the seller can compose a social media post that advertises the product for sale (or simply "for sale post"). The seller can include information related to the product in the social media post, which, when the seller submits the social media post to the social networking system, then becomes part of the structured data associated with the social media post. As used herein, "structured data" can include any data that is structured into specific groups, fields, or categories and/or associated with particular aspects of a post, a person, or a product being sold. Structured data can include metadata associated with node and edge information related to the social media post, information related to the seller, information related to the product, and interaction information related to the social media post within the social networking system. To illustrate, structured data for a for sale post may include a price, a product title/name, a product description, a product location, a product model name/number, a product model year, product specifications, inventory available, or any other specific types of information/data associated with a product being sold. The structured data may also include various media content, such as images (e.g., pictures of a product), video, audio, etc. Using this structured data, the social networking system can facilitate the insertion of "rich" objects within a messaging thread, such rich objects providing more information and/or content than typical textual messages.

In an embodiment, the messaging manager can manage and organize messages between buyers and sellers based on the structured data associated with the seller's social media post. For example, the social networking system can provide various controls associated with the seller's social media post that enable a potential buyer to either purchase the product described in the social media post, or message the seller regarding the offer for sale. In response to the potential buyer selecting the control to message the seller, the messaging manager can pre-populate an electronic message addressed to the seller with part or all of the structured data associated with the social media post. Thus, the messaging manager can organize all messages between the seller and the potential buyer related to the product in a communication thread based on the structured data. Similarly, the messaging manager can organize all messages between the seller and another potential buyer interested in the same product in a different communication thread based on the same structured data.

Furthermore, if a seller has more than one product for sale via the social networking system, the messaging manager can organize all of a seller's communication threads based on the products the seller is selling. As used herein, a "communication thread" is a group of communications (i.e., electronic messages) sent back and forth between/among two or more users (i.e., the product seller and a potential product buyer). In one or more embodiments, a seller may have multiple communication threads with multiple potential buyers, but may not know which product is related to a particular communication thread. Accordingly, the messaging manager can organize a seller's communication threads by the products associated with the communication threads. Next, the message manager can organize the seller's communication threads according to the potential buyers involved in each thread. Thus, the seller can easily determine which products are being discussed in every communication thread, as well as the potential buyers with whom the seller is conversing.

Additionally, the messaging manager can provide a single electronic message (i.e., a "broadcast message") to multiple recipients based on the structured data associated with a particular social media post. For example, in one embodiment, the seller may wish to send an electronic message to each potential buyer who has messaged the seller in relation to a particular product. Accordingly, the messaging manager can add the electronic message to every message thread related to the structured data associated with the particular product. Furthermore, the messaging manager can also generate and automatically send electronic messages to every message thread related to the structured data associated with a particular product in response to detecting a sale of that particular product. These and other features will be described in greater detail below.

FIG. 1 illustrates an example schematic diagram of messaging system 100 (or simply "system 100"). As illustrated in FIG. 1, the system 100 may include client computing devices 102a, 102b, 102c, and 102d, and the social networking system 104, which are communicatively coupled through a network 108. Additionally, the social networking system 104 may also include a messaging manager 106, which will be described in greater detail below with reference to FIG. 2. Also as illustrated in FIG. 1, users 110a, 110b, 110c, and 110d may interact with client computing devices 102a, 102b, 102c, and 102d respectively to access content and/or services on the social networking system 104. Furthermore, each of the client computing devices 102a, 102b, 102c, and 102d may also include a social networking application 112a, 112b, 112c, and 112d respectively, which will be described in greater detail below with reference to FIG. 2.

The client computing devices 102a-102d and the social networking system 104 can communicate via the network 108, which may include one or more networks and may use one or more communication platforms or technologies suitable for transmitting data and/or communication signals. In one or more embodiments, the network 108 may include the Internet or World Wide Web. The network 108, however, can include various other types of networks that use various communication technologies and protocols, such as a corporate intranet, a virtual private network (VPN), a local area network (LAN), a wireless local network (WLAN), a cellular network, a wide area network (WAN), a metropolitan area network (MAN), or a combination of tow or more such networks. Although FIG. 1 illustrates a particular arrangement of the client computing devices 102a-102d, the social networking system 104, and the network 108, various additional arrangements are possible. For example, the client computing devices 102a-102d may directly communicate with the social networking system 104, bypassing the network 108. Additional details relating to the network 108 are explained below with reference to FIG. 8.

As illustrated in FIG. 1, the system 100 can include the users 110a-110d. As described above, the users 110a-110d may be individuals (i.e., human users), businesses, groups, or other entities. Although FIG. 1 illustrates four users 110a-110d, it is understood that the system 100 can include any plurality of users, with each of the plurality of users interacting with the system 100 through a corresponding plurality of client computing devices.

With reference to the system 100 described herein, any of the users 110a-110d may be a sender of an electronic message, and any of the users 110a-110d may be a recipient of an electronic message (e.g., a private or personal message, an instant message, a social media post, or any other type of electronic message). For example, in one embodiment, the user 110d may be an electronic message sender, and the user 110a may be the recipient of the electronic message sent by the user 110d. Alternatively, in another embodiment, the user 110d may send an electronic message to a group rather than to a specific intended recipient. In that case, all users associated with the user 110d via the group within the social networking system (i.e., the users 110a-110c) will become recipients of the electronic message sent by the user 110d.

The client computing devices 102a-102d may include various types of computing devices. For example, the client computing devices 102a-102d can include a mobile device such as a mobile telephone, a smartphone, a PDA, a tablet, a laptop or a non-mobile device such as a desktop, a server, or another type of computing device. Further, the client computing devices 102a-102d may run dedicated social networking applications 112a-112d associated with the social networking system 104 to access social networking content (e.g., electronic messages, webpages, profiles, etc.) associated with the social networking system 104. In turn, the social networking system 104 may present information and content to the users 110a-110d via the social networking applications 112a-112d by way of one or more social networking pages (e.g., web pages or pages/views of a mobile application). Additional details with respect to the client computing devices 102a-102d are discussed below with respect to FIG. 7.

In addition, and as shown in FIG. 1, the system 100 can include the social networking system 104. One or more computing devices executing instructions to perform the processes and provide the features disclosed herein may implement the social networking system 104. For example, one or more server devices may implement and/or provide features associated with the social networking system 104. Additionally, in some embodiments, the social networking system 104 may be partially implemented by one or more of the client computing devices 102a-102d.

The client computing devices 102a-102d of FIG. 1 can also send and receive electronic messages by way of the social networking system 104. For example, the social networking applications 112a-112d installed on each of the client computing devices 102a-102d may communicate with the social networking system 104. In one or more embodiments, the social networking applications 112a-112d can receive inputs from a user via any of the client computing devices 102a-102d (e.g., such as by way of a touch screen of a client computing device) representative of text, or other types of media, for use in an electronic message and/or social media post.

The social networking system 104 can also provide social media posts (whether text or otherwise) to a social networking graphical user interface (e.g., a profile, a newsfeed, or "wall") of one or more users of the social networking system 104. For example, one or more embodiments may present a user 102a, 102b, 102c, or 102d with a social networking system newsfeed and electronic messages from one or more co-users associated with the user 102a, 102b, 102c, or 102d via the social networking system 104. In one or more embodiments, each user 102a, 102b, 102c, or 102d may scroll through the social networking system newsfeed in order to view recent social media posts submitted by the one or more co-users (e.g., friends) associated with the user 102a, 102b, 102c, or 102d via the social networking system 104. In one embodiment, the social networking system 104 may organize the social media posts chronologically in a user's newsfeed. In alternative embodiments, the social networking system 104 may organize the social media posts geographically, by interest groups, according to a relationship coefficient between the user and the co-user, etc. Additionally, in one or more embodiments, the user 102a, 102b, 102c, or 102d may download a copy of the social networking system newsfeed as a record of the social media posts displayed thereon.

Additionally, in one embodiment, the social networking system 104 can transmit social media posts and/or electronic messages between the users 102a, 102b, 102c, and 102d. For example, in response to the user 102a submitting a social media post to the social networking system 104, the social networking system 104 can update the social networking system newsfeeds of the users 102b, 102c, and 102d to include the social media post submitted by the user 102a. Furthermore, in one embodiment, the social networking system 104 can transmit an electronic message between just two of the users 102a, 102b, 102c, or 102d. In that case, the social networking system 104 does not add the electronic message to the social networking newsfeed to a plurality of co-users, but rather provides the electronic message within a social networking graphical user interface (e.g., an inbox or graphical messaging thread) of one or more message recipients. In other words, an electronic message can be a private message between two users of the social networking system 104, and a social media post may be a semi-public message that the social networking system 104 adds to the social networking system newsfeeds of a plurality of co-users of the social networking system 104.

As shown in FIG. 1, the social networking system 104 can also include the messaging manager 106. As with the social networking system 104, in one embodiment the messaging manager 106 is wholly operated on a server (i.e., the social networking system 104) communicatively coupled with one or more client computing devices. In one or more alternative embodiments, the client computing devices 102a-102d can operate the messaging manager 106. In yet other alternative embodiments, the messaging manager 106 can be partially operated on a server and partially operated on one or more client computing devices. The messaging manager 106 will be described in greater detail with reference to FIG. 2.

Figure 2:
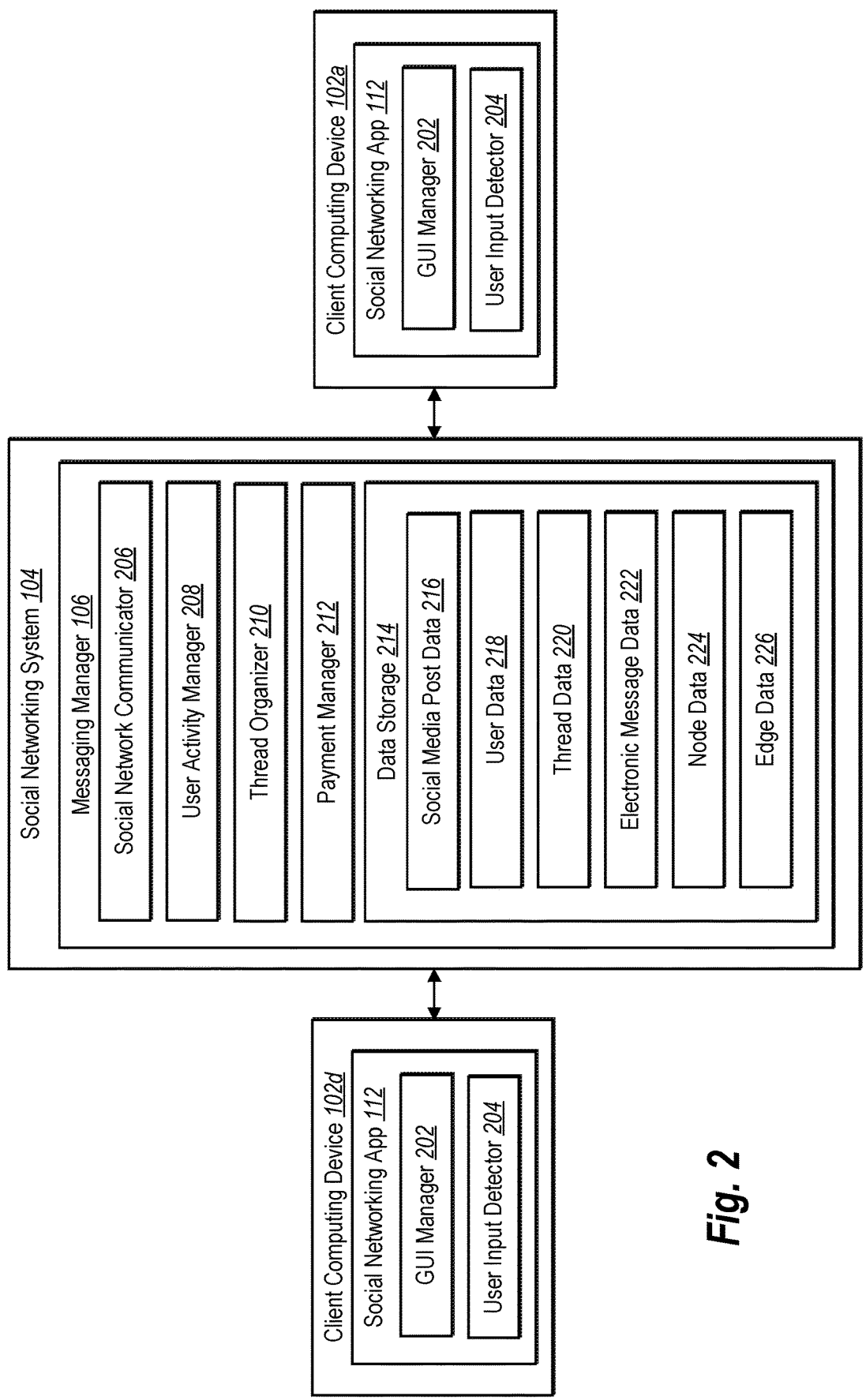
FIG. 2 illustrates a detailed schematic diagram of a messaging manager in accordance with one or more embodiments.

FIG. 2 illustrates a schematic diagram illustrating an example embodiment of the messaging manager 106 and social networking application 112. As shown, the messaging manager 106 and/or social networking application 112 can each include various components for performing the processes and features described herein. For example, as shown in FIG. 2, the social networking application 112 may be installed on a client computing device (i.e., client computing devices 102a and 102d) and can include a graphical user interface ("GUI") manager 202 and an input detector 204. Additionally as shown in FIG. 2, the messaging manager 106 may include, but is not limited to, a social network communicator 206, a user activity manager 208, a thread organizer 210, a payment manager 212, and a data storage 214. The data storage 208 can store social media post data 216, user data 218, thread data 220, electronic message data 222, node data 224, and edge data 226. Although the disclosure herein describes the components 206-214 as separate, as illustrated in FIG. 2, any of the components 206-214 may be combined into fewer components, such as into a single component, or divided into more components as may serve one or more embodiments.

Each of the components 202-204 of the social networking app 112 and the components 206-214 of the messaging manager 106 can be implemented using a computing device including at least one processor executing instructions that cause the processes described herein. In some embodiments, the components 202-204 of the social networking app 112 and/or the components 206-214 of the messaging manager 106 can all be implemented by a single server device, or across multiple server devices. Additionally or alternatively, a combination of one or more server devices and one or more client devices can implement the components 202-204 of the social networking app 112 and the components 206-214 of the messaging manager 106. Furthermore, in one embodiment, the components 202-214 can comprise hardware, such as a special-purpose processing device to perform a certain function. Additionally or alternatively, the components 202-214 can comprise a combination of computer-executable instructions and hardware.

In one or more embodiments, the social networking application 112 can be a native application installed on the client computing device 102a, 102b, 102c, and/or 102d. For example, social networking application 112 may be a mobile application that installs and runs on a mobile device, such as a smart phone or a tablet. Alternatively, the social networking application 112 can be a desktop application, widget, or other form of a native computer program. Alternatively, the social networking application 112 may be a remote application that the client computing device 102d, 102a accesses. For example, the social networking application 112 may be a web application that is executed within a web browser of the client computing device 102d, 102a. Additionally, in at least one embodiment, the social networking application 112 may exist on the client computing device 102a, 102b, 102c, and/or 102d as more than one executable. For example, one executable may handle the newsfeed capabilities of the social networking application 112, while another executable may handle the messaging capabilities of the social networking application 112.

As mentioned above, and as shown in FIG. 2, the social networking application 112 can include a GUI manager 202. The GUI manager 202 can provide, manage, and/or control a graphical user interface (or simply "user interface") that allows a user to compose, view, and send social media posts and electronic messages. For example, the GUI manager 202 can provide a user interface that facilitates the display of a social network user's newsfeed or wall. Likewise, the GUI manager 202 can provide a user interface that displays one or more electronic messages received by a social network user.

More specifically, the GUI manager 202 can facilitate the display of a user interface (e.g., by way of a display device associated with the client computing device 102d, 102a). For example, the GUI manager 202 may compose the user interface of a plurality of graphical components, objects, and/or elements that allow a user to compose, send and receive electronic messages and/or social media posts. More particularly, the GUI manager 202 may direct the client computing device 102d, 102a to display a group of graphical components, objects and/or elements that enable a user to view electronic messages and/or social media posts.

In addition, the GUI manager 202 may direct the client computing device 102d, 102a to display one or more graphical objects, controls, or elements that facilitate user input for composing and sending a social media post and/or electronic message. To illustrate, the GUI manager 202 may provide a user interface that allows a user to provide user input to the social networking application 112. For example, the GUI manager 202 can provide one or more user interfaces that allow a user to input one or more types of content into a social media post or electronic message. As used herein, "content" refers to any data or information to be included as part of a message. For example, the term "content" will be used herein to generally describe text, images, digital media, files, location information, payment information, or any other data that can be included as part of a social media post or electronic message.

As discussed above, one example of content that can be included in a message is content and/or controls associated with a payment from a product buyer to the product seller. In one or more embodiments, the GUI manager 202 can provide a user interface to allow a user to easily and efficiently define and send a payment to one or more other users. For example, the GUI manager 202 can provide one or more input fields and/or one or more user selectable elements with which a user can interact to create and send a payment.

In addition to the forgoing, the GUI manager 202 can receive instructions or communications from one or more components of the social networking application 112 to display updated electronic message information, updated social media post information, etc. The GUI manager 202 can update an available option based on whether a particular option is available at a particular point (i.e., the GUI manager 202 may disable a purchase button on a social media post for a product that has been sold). The GUI manager 202 can add, remove, and/or update various other selectable elements or controls within the certain social media posts and electronic messages, as will be discussed below.

The GUI manager 202 can facilitate the input of text or other data to be included in an electronic message or social media post. For example, the GUI manager 202 can provide a user interface that includes a keyboard. A user can interact with the keyboard using one or more touch gestures to select text to be included in an electronic message or social media post. For example, a user can use the keyboard to enter a message to accompany and/or describe one or more products the seller is advertising for sale via a social media post. In addition to text, the user interface, including the keyboard interface, can facilitate the input of various other characters, symbols, icons, or other character information.

Furthermore, the GUI manager 202 can provide and transition between two or more graphical user interfaces. For example, in one embodiment, the GUI manager 202 can provide a newsfeed to a social networking system user containing one or more social media posts from co-users associated with the user via the social networking system. Later, in response to detected input from the user or the messaging manager 106, the GUI manager 202 can transition to a second messaging graphical user interface containing a listing of messaging threads associated with the user and/or a collection of input controls for composing an electronic message, as described above.

As further illustrated in FIG. 2, the social networking application 112 can include a user input detector 204. In one or more embodiments, the user input detector 204 can detect, receive, and/or facilitate user input in any suitable manner. In some examples, the user input detector 204 can detect one or more user interactions with respect to the user interface. As referred to herein, a "user interaction" means a single interaction, or combination of interactions, received from a user by way of one or more input devices.

For example, user input detector 204 can detect a user interaction from a keyboard, mouse, touch pad, touch screen, and/or any other input device. In the event the client computing device 102d, 102a includes a touch screen, the user input detector 204 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 204 may additionally, or alternatively, receive data representative of a user interaction. For example, user input detector 204 may receive one or more user configurable parameters from a user, one or more user commands from the user, and/or any other suitable user input. The user input detector 204 may receive input data from one or more components of the social networking application 112, from the storage on the client computing device 102d, 102a, or from one or more remote locations (e.g., the social networking system 104).

The social networking application 112 can perform one or more functions in response to the user input detector 204 detecting user input and/or receiving other data. Generally, a user can control, navigate within, and otherwise use the social networking application 112 by providing one or more user inputs that the user input detector 204 can detect. For example, in response to the user input detector 204 detecting user input, one or more components of the social networking application 112 allow a user to select a recipient for a message, compose a message, select content to include in a message, and/or send a message to the recipient. Additionally, in response to the user input detector 204 detecting user input, one or more components of the social networking application 112 allow a user to navigate through one or more user interfaces to review received electronic messages, contacts, etc.

In one or more embodiments, in response to the user input detector 204 detecting one or more user inputs, the social networking application 112 can allow the user to create a payment to send to one or more other users. For example, a user wanting to send a payment can interact with a purchase control provided on a menu within a user interface. Upon detecting the user interaction with the purchase control, the user input detector 204 can cause the GUI manager 202 to provide a user interface for creating a payment. Therefore, in response to the user input detector 204 detecting one or more user inputs, the social networking application 112 can allow a user to create a customized payment that defines a payment to be sent to another user, as will further be described below.

As mentioned above, the messaging manager 106 can include a social network communicator 206. In one or more embodiments, the social network communicator 206 can communicate with the social networking system 104 to receive electronic messages and/or social media posts. As described above, the users 110d, 110a may send electronic messages and social media posts to social networking system 104 via the social networking application 112 on client computing device 102d, 102a. Accordingly, in one embodiment, when the social networking system 104 receives an electronic message or social media post from one of the users 110d, 110a, the social networking system 104 can provide the electronic message or social media post to the messaging manager 106 via the social network communicator 206. For example, the social network communicator 206 may receive an electronic message or social media post composed by one of the users 110a-110d and sent via one of the client computing devices 102a-102d to another one of the users 110a-110d by way of the social networking system 104.

Additionally, the social network communicator 206 can also send electronic messages and social media posts. For example, in one embodiment, the messaging manager 106 may determine to provide an electronic message or social media post composed by a seller of a product to one or more co-users associated with the seller of a product. In that case, the social network communicator 206 can send the electronic message to the one or more co-users via the social networking system 104. In other words, as shown in FIG. 2, the messaging manager 106 may receive an electronic message composed by the user 110d via the social networking application 112 on the client computing device 102d. In response to receiving the electronic message, the social network communicator 206 can then send the electronic message to the user 110a via the social networking application 112 on the client computing device 102a.

The social network communicator 206 can also communicate with the social networking system 104 in order to receive social networking activity information. In one or more embodiments, social networking activity information can be associated with a social media post. For example, social networking activity information associated with a social media post can include user interaction information such as, but not limited to, how many "likes" a social media post has received, how many times a social media post has been re-shared or reposted, how many users have been tagged or untagged in a social media post, etc.

In one or more embodiments, social networking activity information can also be associated with a particular user. For example, social networking activity information associated with a particular user can include information such as, but not limited to, which social media posts the particular user has "liked," which social media posts, the particular user has re-posted or shared, which posts the particular user has interacted with in other ways, etc. In one embodiment, the social networking activity associated with a particular user may also include the particular user's profile information, friend list, and social networking system history.

In another embodiment, social networking activity information can also be related to commercial transactions. As mentioned above, users of the social networking system 104 can utilize various features of the social networking system 104 to conduct commercial transactions. Accordingly, in one or more embodiments, the social networking system 104 includes features that allow users to buy and sell goods. For example, such features may include graphical user interface controls including message controls, purchase controls, invoice-generating controls, and other controls for facilitating commercial transactions and displayed by the GUI manager 202 of the social networking application 112. Thus, in one or more embodiments, the social network communicator 206 can communicate with the social networking system 104 in order to receive information related to a user's interactions with features of the social networking system 104 that facilitate commercial transactions as detected by the user input detector 204 of the social networking application 112.

As mentioned above, and as illustrated in FIG. 2, the messaging manager 106 can also include a user activity manager 208. The user activity manager 208 can monitor social networking system activity information received by the social network communicator 206. For example, as described above, the social network communicator 206 can receive social networking activity information associated with a user representative of various actions taken by the user as detected by the user input detector 204 of the social networking application 112. In one or more embodiments, the messaging manager 106 can monitor the social networking activity information for specific actions taken by the user.

For instance, in one embodiment, a seller can submit a social media post to the social networking system 104 that includes information related to a product the seller wishes to advertise for sale. The social media post can include a purchase control (i.e., a button) that a potential buyer can interact with (i.e., click or tap) in order to purchase the product. The social media post can also include a message control that a potential buyer can interact with in order to send an electronic message to the seller. In one or more embodiments, the user activity manager 208 can monitor social networking system activity information related to the potential buyer in order to identify user interactions that indicate a potential buyer's desire to either purchase an product for sale, or message a seller.

In response to a detected interaction of a potential buyer with a message control (i.e., a "message me" button) included on a seller's social media post, the user activity manager 208 can instruct the GUI manager 202 of the social networking application 112 to transition to a new graphical user interface. For example, as described above, in response to detected input from the messaging manager 106, the GUI manager 202 of the social networking application 112 can transition between various graphical user interfaces. Accordingly, in response to the potential buyer indicating a desire to message the seller associated with a social media post, the user activity manager 208 can instruct the GUI manager 202 of the social networking application 112 of a client computing device associated with the potential buyer to transition from a graphical user interface containing the potential buyer's newsfeed to a messaging graphical user interface. The messaging graphical user interface can be a graphical user interface within the social networking application 112 or within a separate, standalone application (e.g., a standalone messaging application).

Additionally, in response to the detected interaction of the potential buyer with the message control included on the seller's social media post, the user activity manager 208 can provide a pre-populated electronic message to the potential buyer. For example, in one embodiment, the messaging manager 106 may provide, via the social network communicator 206, the generated pre-populated electronic message to the potential buyer within a messaging graphical user interface. In one or more embodiments, the messaging manager 106 pre-populates the pre-populated electronic message with at least part of the structured data associated with the seller's social media post. As described above, the structured data associated with the seller's social media post can include a picture and/or description of the product advertised in the seller's social media post, as well as other node and edge data associated with the seller's social media post. For example, in one or more embodiments, the pre-populated message can be a "rich" object including content (e.g., a photograph) and text (e.g., name and/or description of the product) derived from the structured content associated with the seller's post. The potential buyer can add an electronic message (e.g., a question about the price of the product advertised in the seller's social media post, etc.) to the seller to the pre-populated electronic message, and the social networking communicator 206 can send both the electronic message and the pre-populated electronic message to the seller.

Furthermore, in one embodiment, the social networking system 104 can provide a seller with a graphical user interface control that a seller can interact with once the seller sells a product advertised in a social media post in order to inform other social networking system users that the product is no longer for sale. For example, when a seller submits a social media post advertising a product for sale with a purchase control and a message control, the social networking system 104 may provide an additional "mark as sold" control associated with the product only to the product seller. In other words, the social networking system 104 can provide a "mark as sold" button only within the seller's social networking system newsfeed. Thus, when the seller sells the product, the seller can click the "mark as sold" button in order to inform other users that the product is no longer available. Accordingly, in one or more embodiments, the user activity manager 208 can monitor social networking system activity information related to the seller in order to identify user interactions that indicate a product is no longer for sale.

Additionally, the user activity manager 208 can monitor social networking system activity received by the social network communicator 206 for other types of purchase events. For example, as described above, the user activity manager 208 can monitor social networking system activity related to the seller for a "mark as sold" button click, which is one type of purchase event. Other types of purchase events can include, but are not limited to, a potential buyer interacting with a purchase control associated with the seller's social media post, deleting of a social media post advertising a given product, detecting a communication thread between a seller and potential buyer containing one or more electronic messages that include "purchase language" (e.g., "I'd like to buy this," "Ok, I'll sell it to you," "I'll pay your asking price," etc.), and detecting a communication thread between a seller and potential buyer containing a product invoice. In one or more embodiments, the seller associated with the social media post can configure the social network communicator 206 to monitor social networking system activity for any type of purchase event.

In one or more embodiments, the user activity manager 208 can take certain social networking system activity information in account when determining whether a purchase event has occurred. For example, as described above, the social networking communicator 206 can receive social networking activity information including user profile information, friend list information, social networking history information, etc. In one embodiment, in response to detecting a communication thread wherein a potential buyer states, "I'd like to buy this," the user activity manager 208 may determine a purchase event has not taken place in light of the fact that the potential buyer has never purchased anything via the social networking system 104. Similarly, in response to detecting a communication thread wherein a potential buyer states, "This is just what I need," the user activity manager 208 may determine a purchase event has taken place in light of the message and/or the fact that the potential buyer and the product seller are on each other's friend lists, and that the potential buyer frequently purchases products from the product seller.

In addition to generating the pre-populated electronic message described above, the user activity manager 208 can also generate other types of messages. For example, in response to a detected purchase event associated with a seller's social media post, the user activity manager 208 can generate an electronic message containing a "sold notification." The sold notification can contain a message stating the product associated with the seller's social media post has been sold. Additionally, the sold notification can also contain at least a portion of the structured data associated with the seller's social media post. In some embodiments, the seller can configure an electronic message for the user activity manager 208 to include in the generated sold notification. Accordingly, the user activity manager 208 can provide, via the social network communicator 206, the generated sold notification to one or more potential buyers who have contacted the seller regarding the product associated with the seller's social media post.

Furthermore, after the sale of a particular product and in response to an extraneous electronic message related to the now-sold product, the user activity manager 208 can intercept the electronic message and generate a reply informing the electronic message sender that the particular product is no longer available. For example, a product seller may submit a social media post advertising a bike for sale, and then subsequently sell the bike. If the product seller fails to mark the product as sold, or otherwise update the social media post, another social networking system user would have no reason to know that the product seller has sold the bike. Accordingly, if the social networking system user sends an electronic message to the product seller regarding the bike, rather than cluttering the product seller's inbox with a pointless electronic message, the user activity manager 208 can generate a reply electronic message informing the social networking system user that "sorry, the bike has already been sold."

The user activity manager 208 can also monitor social networking system activity received by the social network communicator 206 for other types of interactions by the seller with the social networking application 112. For example, in one embodiment, the GUI manager 202 can include a messaging control to a seller associated with a social media post that enables the seller to compose a broadcast message for delivery to all potential buyers who have contacted the seller regarding a particular product (i.e., a "message all" button). In response to a detected interaction between the seller and this messaging control, the user activity manager 208 can instruct the GUI manager 202 to provide a messaging graphical user interface to the seller that enables the seller to compose the desired broadcast message and send the composed broadcast message to the correct recipients.

As mentioned above, and as illustrated in FIG. 2, the messaging manager 106 can also include a thread organizer 210. As described above, a product seller and one or more potential buyers of the product can send and receive electronic messages related to the product. The thread organizer 210 can organize all electronic messages into communication threads of electronic messages. For example, in one or more embodiments, the thread organizer 210 can organize all electronic messages sent to a seller into communication threads based on a product associated with each electronic message (i.e., as defined in the structured data included with each electronic message). To illustrate, as mentioned above, the user activity manager 208 can provide an electronic message to a potential buyer that is pre-populated with at least a portion of the structured data associated with a social media post. The social network communicator 206 includes this structured data as part of the electronic message the social network communicator 206 sends from the potential buyer to the seller associated with the social media post. Accordingly, the thread organizer 210 can organize every electronic message between that potential buyer and the product seller into a communication thread based on the structured data included in the initial electronic message from the potential buyer.

Additionally, in addition to organizing communication threads according to the structured data associated with each communication thread, the thread organizer 210 can further organize the message threads based on the potential buyers associated with each communication thread. For example, a product seller may receive electronic messages from multiple potential buyers who are all interested in the same product advertised by the product seller. Accordingly, the thread organizer 210 can organize communication threads generally according to the product, and can further organize communication threads based on the potential buyer from whom each communication thread originates.

Furthermore, the thread organizer 210 can communicate, via the social network communicator 206, the organization to the GUI manager 202 of the social networking application 112. For example, as described above, the GUI manager 202 can provide a messaging graphical user interface via a display of the client computing device 102a or 102d. In one or more embodiments, the messaging graphical user interface can include a listing of communication threads associated with a particular user. In one embodiment, the GUI manager 202 can organize the listing of communication threads in the messaging graphical user interface according to the organization determined by the thread organizer 210 for a particular user.

As mentioned above, and as illustrated in FIG. 2, the messaging manager 106 can also further include a payment manager 212. The payment manager 212 can facilitate sending and receiving payments between sellers and buyers of products via the social networking system 104. As generally explained above, the payment manager 212 can coordinate a purchase transaction associated with a product advertised by a seller via a social media post. For example, in response to a detected interaction of a buyer with a purchase control associated with a social media post advertising a product, the GUI manager 202 can provide one or more controls to facilitate the purchase transaction (e.g., input fields for billing information, input fields for shipping information, etc.). Additionally or alternatively, the payment manager 212 can simply act as a gateway to a third party payment system.

Additionally, in some embodiments, the payment manager 212 can also provide invoices to a seller. For example, in one embodiment, the seller may send a product invoice to a buyer in response to the buyer expressing a desire to purchase the product. Accordingly, the payment manager 212 can generate an invoice for the product that includes, but is not limited to, the cost of the product, the payment terms for the purchase, and other information associated with the seller (e.g., the name the buyer can make a check out to, the seller's business address, etc.). In one or more embodiments, the payment manager 212 can generate the invoice as a document file (i.e., a portable document file), an electronic message, or any other format suitable for this purpose.

In one or more embodiments, the payment manager 212 can also determine a level of risk associated with a potential buyer. For example, the payment manager 212 can analyze social network activity information, described above, in order to determine whether a potential buyer has previously made purchases via the social networking system 104, whether the potential buyer has a satisfactory payment record connected to any purchases made via the social networking system 104, and whether the potential buyer is associated with complaints registered with the social networking system 104. In one embodiment, the payment manager 212 may also interact with a third party system in order to identify a credit score associated with the potential buyer. Based on an analysis of these various factors, the payment manager 212 may deny a purchase initiated by the potential purchase.

In one or more embodiments, the messaging manager 106 can also include the ability to hold purchase funds in escrow. For example, in one embodiment, the payment manager 212 can allow any of the users 110a-110d to maintain an escrow account including monetary funds that are held by the social networking system 104. The escrow account allows a user to set aside funds toward a purchase the user plans to make via the social networking system 104.

For instance, a user may wish to buy a bicycle listed for sale at a price of $200 within a social media post. The payment manager 212 can allow the user to reserve the bicycle (i.e., place the bicycle on hold such that no one else can buy it) by putting an amount of money into escrow that is earmarked for the purchase of the bicycle. The amount of money the user puts into escrow can be the full $200, or a percentage of the full amount. At that point, the bicycle seller can agree to sell the bicycle to the user, or can refuse the sale and open the social media post back up. If the bicycle seller agrees to sell the bicycle to the user, the payment manager 212 can release the escrow funds to the seller when the seller transfers the bicycle to the user (e.g., when the buyer indicates that it has taken possession of the purchased product).

In some embodiments, while the bicycle is in escrow, the messaging manager 106 can update the social media post to indicate that the bicycle is in escrow and can be expected to sell to the user. Alternatively, in some embodiments, while the bicycle is in escrow, the messaging manager 106 can hide the social media post entirely, such that the social media post does not appear within newsfeeds or search results for any other users within the social networking system 104. Allowing purchasers and sellers to utilize an escrow system increases the ability of purchasers and sellers to trust that they are engaging in legitimate transactions. The escrow system also encourages sellers to deliver goods to purchasers who have placed money into escrow for the goods.

Furthermore, as mentioned above, and as illustrated in FIG. 2, the messaging manager 106 can also include a data storage 214. As shown, the data storage 214 can include social media post data 216, user data 218, thread data 220, electronic message data 222, node data 224, and edge data 226. In one or more embodiments, the social media post data 216 can include data representative of social media post information, such as described herein. Similarly, in one or more embodiments, user data 218 can include data representative of user information, such as described herein. In one or more embodiments, thread data 220 and electronic message data 222 can include data representative of thread information and electronic message information, respectively, also as described herein. Finally, in one or more embodiments, node data 224 and edge data 226 can include data representative of node information and edge information, respectively, also as described herein.

As described above, the messaging manager 106 can perform various functions (i.e., providing pre-populated electronic messages, sending broadcast electronic messages, etc.) in association with structured data associated with a particular social media post. In one or more embodiments, the data storage 214 stores the structured data as node and edge information. For example, the data storage 214 may store nodes and edges in a social graph, where each edge connects two nodes, and one node can be connected via edges to one or more additional nodes.

A node may comprise a plurality of user nodes. A user node of a social graph may correspond to and include user data 218. A user may be an individual (human user), an entity (e.g., an enterprise, business, or third-party application), or a group (e.g., of individuals or entities). A user node corresponding to a user may comprise information provided by the user (e.g., user data 218) and information gathered by various systems, including the social networking system 104 (e.g., social media post data 216, thread data 220, electronic message data 222). As described above, the user data 218 may include the user's name, profile picture, city of residence, contact information, birth date, gender, marital status, family status, employment, educational background, preferences, interests, and other demographic information to be included in the user node.

Each user node of the social graph may have a corresponding web page (typically known as a "profile page"). For example, the social networking system 104 can access a user node corresponding to the user and construct a profile page including the user's name, a profile picture, and other information associated with the user. A profile page may include all or a portion of the information stored within a user's node based on one or more privacy settings or other configurable settings.

Additionally or alternatively, a node may also include a plurality of product nodes. Each product node may correspond to a particular product or a group of products. A product node can include any suitable information associated with a product, and in some embodiments the data storage 214 can include social media post data 216 as part of a product node. For example, a product node can include a name of a product, a description of the product, an identification of one or more advertisers that provide the product, specifications for the product, price information for the product, images of the product, videos of the product, an identification of users that own or use the product, an identification of users that want the product, an identification of users that "like" the product, an identification of users that have otherwise expressed interest in or interacted with the product, a URL address for a web site associated with the product, a product category associated with the product, an identification of one or more related products, one or more recommendations or reviews of the product, one or more ratings of the product, options (e.g., size options, color options, shipping options, purchase options) for the product, a manufacturer of the product, or any other information associated with the product. Similar to user nodes, each product node of the social graph may correspond to a web page or profile page where users can access the corresponding product information. For example, the social networking system 104 can access a product node corresponding to a product, and construct a profile page (e.g., viewable by a browser or mobile application) including product information from the product node.

An edge (stored in the data storage 214 as edge data 226) between a pair of nodes may represent a relationship between the pair of nodes. For example, an edge between two user nodes can represent a friendship between two users. As another example, an edge between a user node and a product node can represent a relationship between a user and a product (e.g., that the user likes the product or uses/owns the product) or an interaction between the user and the product (e.g., that the user mentioned the product, shopped for the product, viewed a profile page for the product, etc.). As a further example, an edge between two product nodes can represent a relationship between two products (e.g., that the products are in a common product category, that the products are often purchased together, that users interested in one product are often interested in the other, that the products share one or more common attributes, etc.). Furthermore, an edge between a product node and a product group node (e.g., a product node for a group or category of products as opposed to a single product) may represent that the product belongs to the product group.

Edges between user nodes and product nodes may be based on social networking activity information obtained by the social networking system 104. In particular, if social networking activity information indicates an interaction between a user and a product, the social networking system 104 may create an edge between a user node associated with the user and a product node associated with the product to represent that social networking activity of the user. In particular, the social networking system 104 may generate an edge (e.g., stored as edge data 226) between a user node and a product node to represent any social networking activity related to a particular product or product category.

The degree of separation between any two nodes is defined as the minimum number of "hops" required to traverse the social graph from one node to the other. A degree of separation between two nodes can be considered a measure of relatedness between the users or the products represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." Degrees of separation apply equally to relationships between user nodes and product nodes.

For example, a user node being connected to a product node by a single degree of separation may indicate a closer relationship or greater product interest than a connection by multiple degrees of separation. The more degrees of separation between a user node and a product node may indicate a lower likelihood of interest by the user in the corresponding product. Furthermore, a connection between a user node and a product node by way of another user node may indicate a likely interest in the product because the user is connected to another user that is connected to the product in some way. To illustrate, a user interested in purchasing a new smartphone may be interested to learn what smartphones are used by the user's friends or friends of friends. Accordingly, connections between a user node and a product node by way of one or more other user nodes may be particularly helpful to a user researching product information.

As discussed, the systems and methods laid out above with reference to FIGS. 1-2 can organize communication threads between a seller and one or more potential buyers based on structured information associated with a social media post and/or a corresponding product node. Additionally, the systems and methods laid out above allow a seller to send a single message to multiple potential buyers based on structured data associated with a social media post. FIGS. 3A-3E illustrate an example process diagram of one or more example embodiments of processes implemented by the system 100 discussed above. Consistent with system 100 illustrated in FIGS. 1 and 2, FIGS. 3A-3E illustrate the user 110d utilizing the client computing device 102d and acting as a product seller, the users 110a and 110b utilizing client computing devices 102a and 102b respectively and acting as potential product buyers, and the social networking system 104 that supports the messaging manager 106.

Figure 3A:
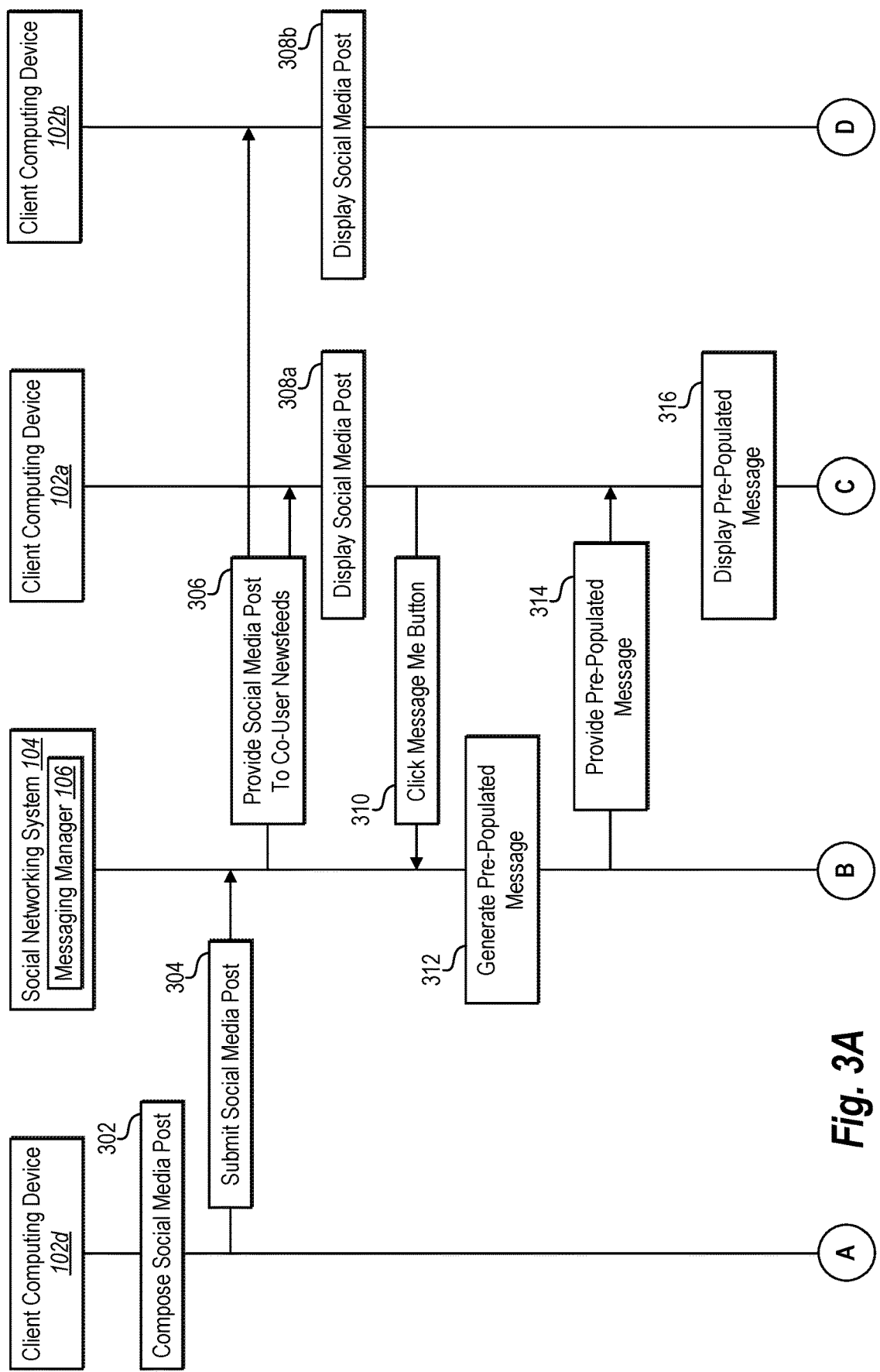
FIGS. 3A-3E illustrate a sequence-flow diagram illustrating interactions as part of a communication process between a product seller and multiple potential product buyers in accordance with one or more embodiments.

In one or more embodiments, as shown in FIG. 3A, the illustrated process begins with the product seller composing a social media post 302 (e.g., a "for sale" post) on the client computing device 102d. As described above, a product seller can compose a social media post that includes information advertising a product for sale. For example, the product seller can include information in the social media post including a picture and description of the product as well as other information related to the product (e.g., the product price, delivery options, etc.). In one or more embodiments, the product seller or the social networking system 104 can configure the social media post to include a purchase control and/or a messaging control. In one embodiment, the purchase control can enable a purchase transaction via the social networking system 104. Similarly, the messaging control can enable the creation of a new messaging session between the seller and a potential buyer.

After the product seller composes a social media post 302 advertising a product for sale, the product seller can submit the social media post 304. As described above, upon receiving a social media post, the messaging manager 106 can create and/or access structured data associated with the social media post. The structured data can include data associated with the product and the seller. The structured data can also include node and edge data associated with the social media post.

After receipt of the social media post, the messaging manager 106 can provide the social media post to co-user newsfeeds 306. As mentioned above, the users 110a, 110b, and 110d may be "friends" (i.e., social networking system co-users). Additionally or alternatively, the users 110a, 110b, and 110d may be common members of a group hosted by the social networking system 104. As described above, the social networking system 104 can host groups that act as marketplaces where certain types of products are sold and purchased.

Accordingly, upon receipt of the social media post, the GUI manager 202 of the social networking application 112 installed on both client computing devices 102a, 102b can display the social media post 308a, 308b via a display of the client computing device 102a, and the client computing device 102b. As mentioned above, the GUI manager 202 can include the provided social media post as part of a newsfeed (i.e., a "wall") on each of the client computing devices 102a, 102b. The GUI manager 202 can display the social media post on each of the client computing devices 102a, 102b according to display configurations associated with the social networking application 112 on each of the client computing devices 102a, 102b.

As described above, the social media post can include a message control that enables a potential buyer to message a product seller. Thus, the user 110a can interact with the social media post displayed on the client computing device 102a (i.e., the user 110a can click the "message me" button 310). In additional or alternative embodiments, the user's 110a interaction with the message control can be a verbal command, or any other type of interaction suitable for this purpose.

In response to the user 110a clicking the "message me" button 310, the messaging manager 106 can generate a pre-populated electronic message 312. As described above, the messaging manager 106 can generate a pre-populated electronic message that includes at least a portion of the structured data associated with the social media post. For example, the messaging manager 106 can include within the pre-populated electronic message structured data including a picture of the product advertised in the social media post, a description of the product advertised in the social media post, and other data associated with the social media post. In some embodiments, the messaging manager 106 may also include in the pre-populated electronic message other structured data that may not be displayed, such as node and edge information. The messaging manager 106 can then provide the generated pre-populated electronic message 314 to the client computing device 102a, from where the user 110a clicked the "message me" button 310.

Upon receipt of the pre-populated electronic message, the GUI manager 202 of the social networking application 112 installed on the client computing device 102a can display the pre-populated electronic message 316. As described above, the GUI manager 202 can displays the pre-populated electronic message 316 via a display of the client computing device 102a (e.g., via a touch screen of a mobile device). Additionally, in one or more embodiments, upon receiving the pre-populated electronic message, the GUI manager 202 can display the pre-populated electronic message 316 in a messaging graphical user interface, rather than as part of the newsfeed. For example, upon receiving the pre-populated electronic message, the GUI manager 202 can replace the graphical user interface wherein the GUI manager 202 displays the newsfeed with a messaging graphical user interface that contains the pre-populated electronic message in addition to other input controls (i.e., a touch screen display keyboard, etc.).

In one or more embodiments, the GUI manager 202 can present the pre-populated electronic message to the user within a standalone dedicated messaging application. For example, as mentioned above, the social networking application 112 can operate as more than one executable within the client computing device 102d, 102a. Accordingly, in at least one embodiment, one executable installed on the client computing device 102d, 102a can be a standalone alone messaging application that handles the messaging capabilities of the social networking application 112.

Figure 3B:
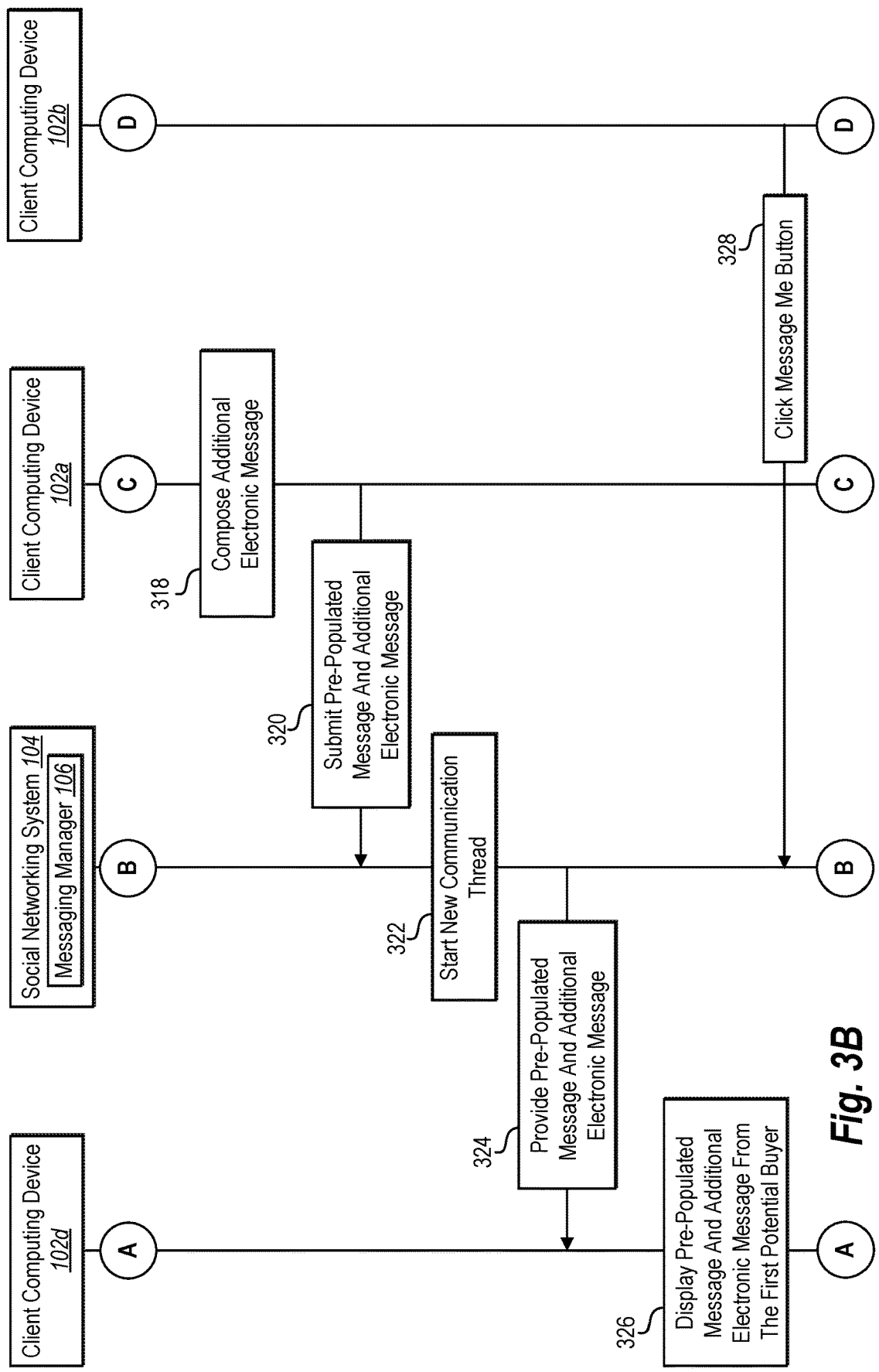

At this point, as shown in FIG. 3B, the user 110a can compose an additional electronic message 318 via the messaging graphical user interface provided by the GUI manager 202 on the client computing device 102a. As described above, the messaging manager 106 provides the pre-populated electronic message 314 in order to organize a communication thread between the seller of a product and a potential buyer of the product. Accordingly, the messaging manager 106 provides the pre-populated electronic message to the user 110a of the client computing device 102a first, such that the user 110a can compose an additional electronic message 318 that the messaging manager 106 will eventually send in tandem with the pre-populated electronic message to the product seller. The additional electronic message can include text (e.g., a request for additional information about the product), a purchase offer (e.g., via a purchase control included as part of the messaging graphical user interface), etc. The user 110a can then submit, via the client computing device 102a, the pre-populated electronic message and the additional electronic message 320 to the messaging manager 106 for delivery product seller.

When the messaging manager 106 receives the pre-populated electronic message and the additional electronic message, the messaging manager 106 can start a new communication thread 322. As described above, the messaging manager 106 can utilize the structured data associated with a pre-populated electronic message to organize one or more communication threads associated with a particular seller. Accordingly, upon receiving the pre-populated electronic message and the additional electronic message, the messaging manager 106 can start a new communication thread 322 associated with the product seller, the user 110a of client computing device 102a, and organized according to the structured data within the pre-populated electronic message. In one or more embodiments, the messaging manager 106 will organize all future messages between the product seller and the user 110a of client computing device 102a related to the product associated with the structured data within the pre-populated electronic message within the new communication thread.

After the messaging manager 106 starts the new communication thread 322, the messaging manager 106 can then provide the pre-populated electronic message and the additional electronic message 324 to the user 110d (i.e., the product seller) of the client computing device 102d. The GUI manager 202 of the social networking application 112 installed on the client computing device 102d can then display the pre-populated electronic message and the additional electronic message 326 from the potential buyer (i.e., user 110a) via a display associated with the client computing device 102d (e.g., a touch screen display of a mobile device). As described above, the messaging manager 106 can provide the pre-populated electronic message to the product seller (i.e., the user 110a) of the client computing device 102d such that the product seller can easily discern the product to which the additional electronic message is referring.

Figure 3C:
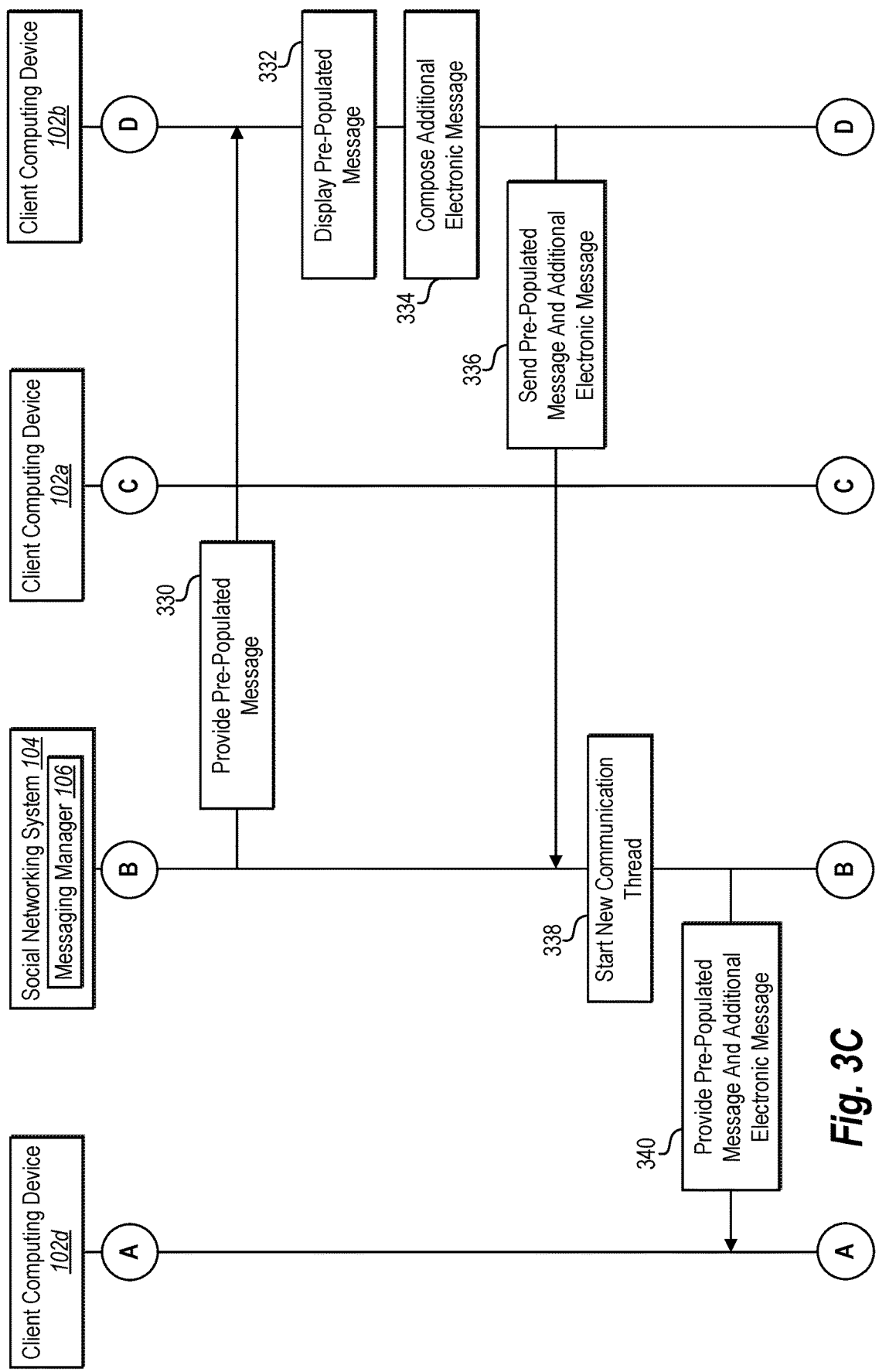

As described above, the messaging manager 106 can provide a social media post composed by the product seller to multiple co-users associated with the product seller via the social networking system 104 (i.e., step 306). Accordingly, also as described above, the GUI manager 202 of the social networking application 112 installed on the client computing device 102b can display the social media post 308b. At some point following this, the user 110b of the client computing device 102b can click the "message me" button 328 displayed as part of the social media post (i.e., the messaging control included in the social media post). In response to the detected interaction with the messaging control, as shown in FIG. 3C, the messaging manager can provide a pre-populated electronic message 330 to the client computing device 102b. The pre-populated electronic message the messaging manager 106 provides to the client computing device 102b may be the same as the pre-populated electronic message the messaging manager 106 provided to the client computing device 102a, as described above, or may be a different pre-populated electronic message.

As described with reference to the client computing device 102a, upon receipt of the pre-populated electronic message, the GUI manager 202 of the social networking application 112 installed on the client computing device 102b can display the pre-populated electronic message 332 with a messaging graphical user interface, as shown in FIG. 3C. The user 110b can utilize various input controls of the messaging graphical user interface to compose an additional electronic message 334. Following this, the social networking application 112 of the client computing device 102b can submit the pre-populated electronic message and the additional electronic message 336 to the messaging manager 106.

Figure 3D:
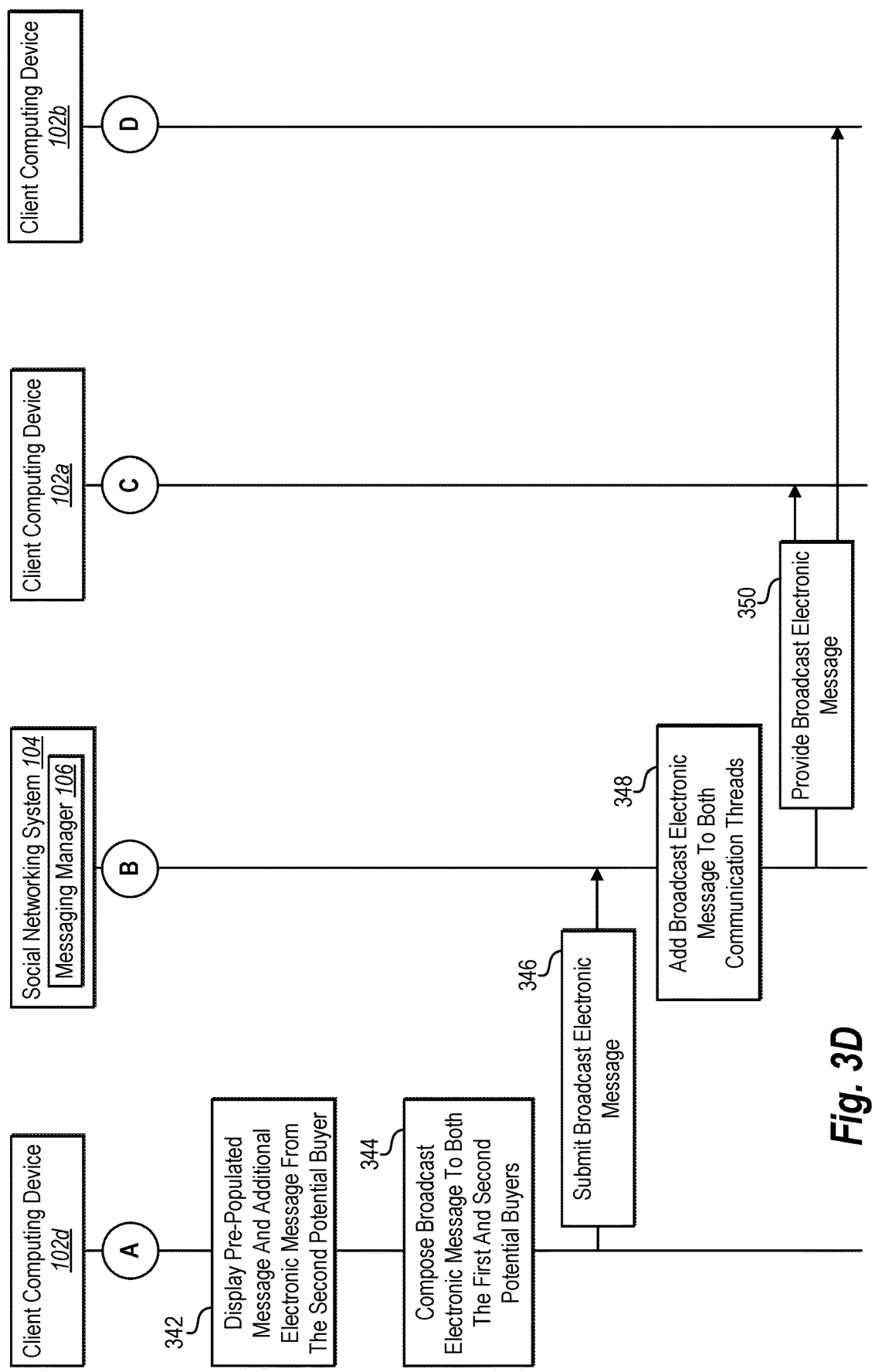

Upon receipt of the pre-populated electronic message and the additional electronic message, the messaging manager 106 can start a new communication thread 338 associated with the product seller and the user 110*b* of the client computing device 102*b*. This new communication thread is separate from the communication thread described above with reference to the user 110*a* of the client computing device 102*a*. Accordingly, the messaging manager 106 can organize all future electronic messages between the user 110*b* and the product seller that are related to the product advertised in the social media post according to the structured data included in the pre-populated electronic message. The messaging manager 106 can then provide the pre-populated electronic message and the additional electronic message 340 to the client computing device 102*d*, where the GUI manager 202 therein can then, as shown in FIG. 3D, display the pre-populated electronic message and the additional electronic message 342 from the user 110*b* of client computing device 102*b* to the user 110*d* (i.e., the product seller).

As mentioned above, the messaging manager 106 can enable a product seller to compose and send a broadcast electronic message to all potential buyers who have contacted the product seller regarding a particular product (e.g., a message informing the potential buyers of a price reduction, or a limited supply, etc.). For example, as shown in FIG. 3D, after receiving a plurality of electronic messages from various potential buyers (i.e., users 110*a*, 110*b*), the product seller (i.e., user 110*d*) can compose a broadcast electronic message 344 utilizing the input detector 204 and GUI manager 202 of the social networking application 112 installed on the client computing device 102*d*. The user 110*d* can then submit the broadcast electronic message 346 to the messaging manager 106.

Upon receiving the broadcast electronic message, the messaging manager 106 can add the broadcast electronic message to the communication threads 348 that the messaging manager 106 has organized and maintained for the product seller and the first potential buyer (i.e., user 110*a*), and for the product seller and the second potential buyer (i.e., user 110*b*). Following this, the messaging manager 106 can then provide the broadcast electronic message 350 to both the client computing device 102*a* and the client computing device 102*b*. As described above, the GUI manager 202 of both the client computing device 102*a* and the client computing device 102*b* can display the broadcast electronic message 352*a*, 352*b* via a display of the client computing device 102*a* and the client computing device 102*b*, respectively, as shown in FIG. 3E.

Figure 3E:
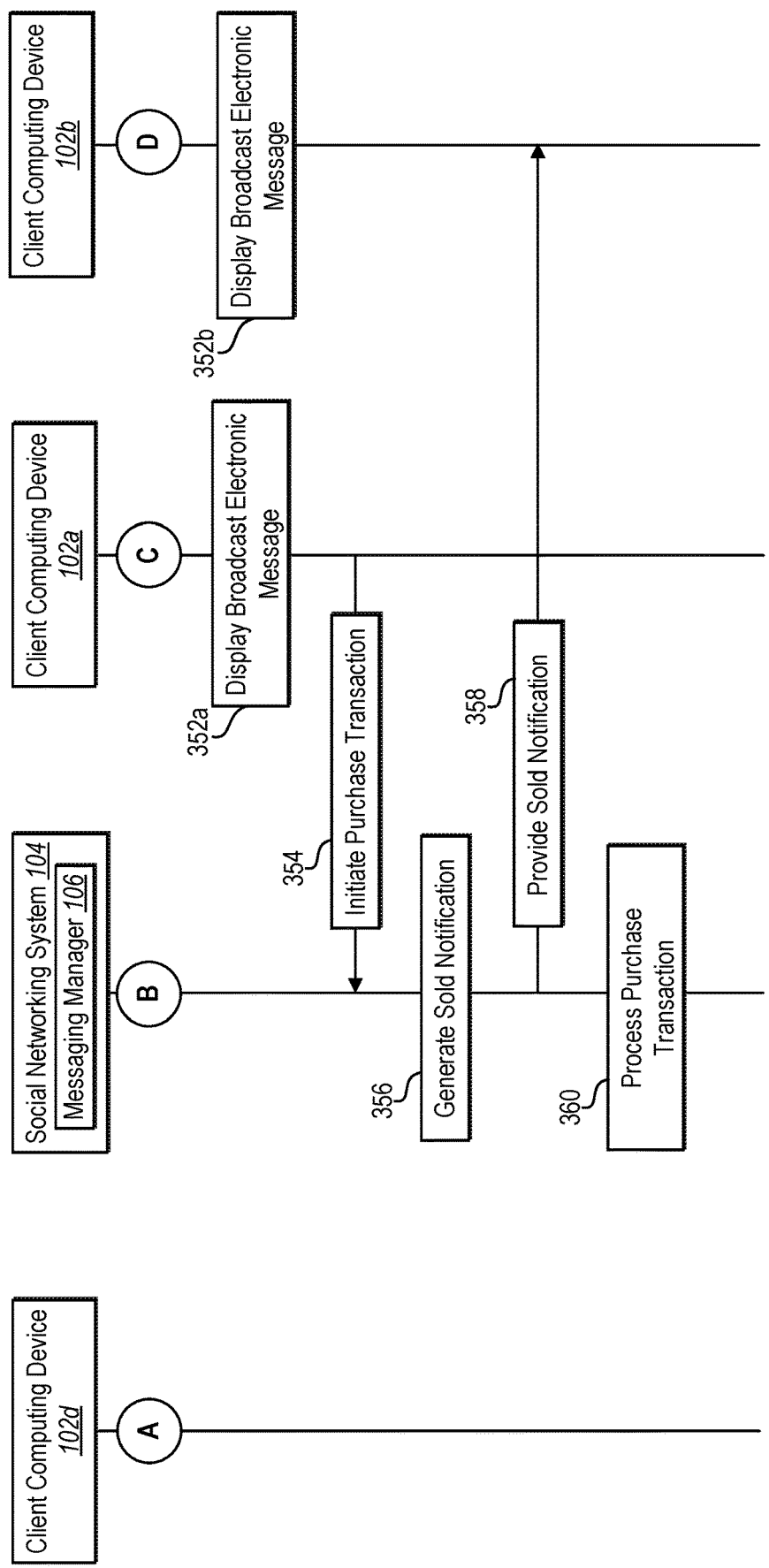

Next, in the displayed embodiment in FIG. 3E, the user 110*a* of the client computing device 102*a* may decide to initiate a purchase event 354 with the product seller. The user 110*a* may initiate the purchase event in several different ways. For example, in one embodiment, the user 110*a* may select a purchase control associated with the social media post, or a purchase control contained within the messaging graphical user interface. In another embodiment, the messaging manager 106 may recognize purchase language in one or more electronic messages sent by the user 110*a* (e.g., "I'd like to purchase this," etc.). Additionally or alternatively, the product seller may initiate the purchase event. For example, the product seller may select the "mark as sold" button associated with the social media post.

In one embodiment, and in response to detecting the initiation of the purchase event, the messaging manager 106 can generate a sold notification 356. As described above, the sold notification may simply be a message informing the one or more potential buyers that the product has been sold (i.e., "Sorry, this product is no longer for sale," etc.). The messaging manager 106 can generate the sold notification with no further input from the product seller. Furthermore, in one embodiment, the product seller can specify the contents of the sold notification.

After the messaging manager 106 has generated the sold notification, the messaging manager 106 can provide the sold notification 358 to all potential buyers with whom the seller is included in at least one communication thread, besides the potential buyer who has purchased the product. In one embodiment, the messaging manager 106 can also add the sold notification to each of these communication threads. Alternatively, the messaging manager 106 can remove these extraneous communication threads from the data storage 214. Finally, the messaging manager 106 can facilitate and/or process the purchase of the product 360.

As will be described in more detail below, the components of the system 100 as described with regard to FIGS. 1-3 can provide, along and/or in combination with the other components, one or more graphical user interfaces ("GUIs"). In particular, the components can allow a user to interact with a collection of display elements for a variety of purposes. In particular, FIGS. 4A-6C and the description that follows illustrate various example embodiments of the user interfaces and features that are in accordance with general principles as described above.

Figure 4B:
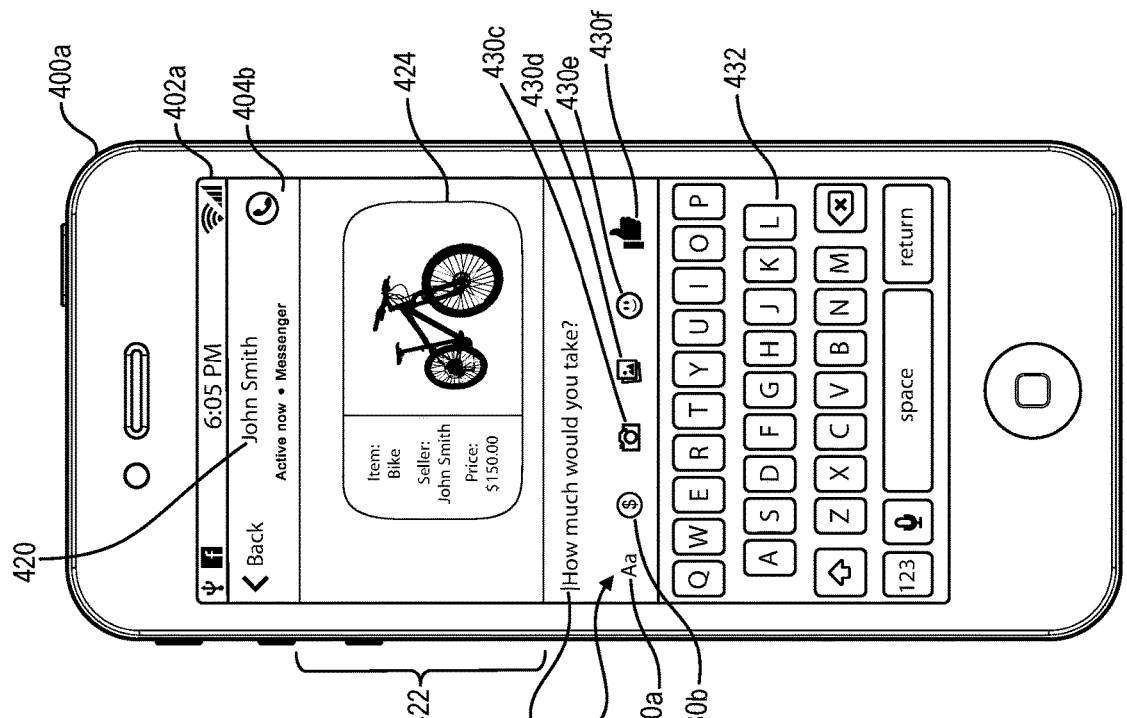
Figure 4A:
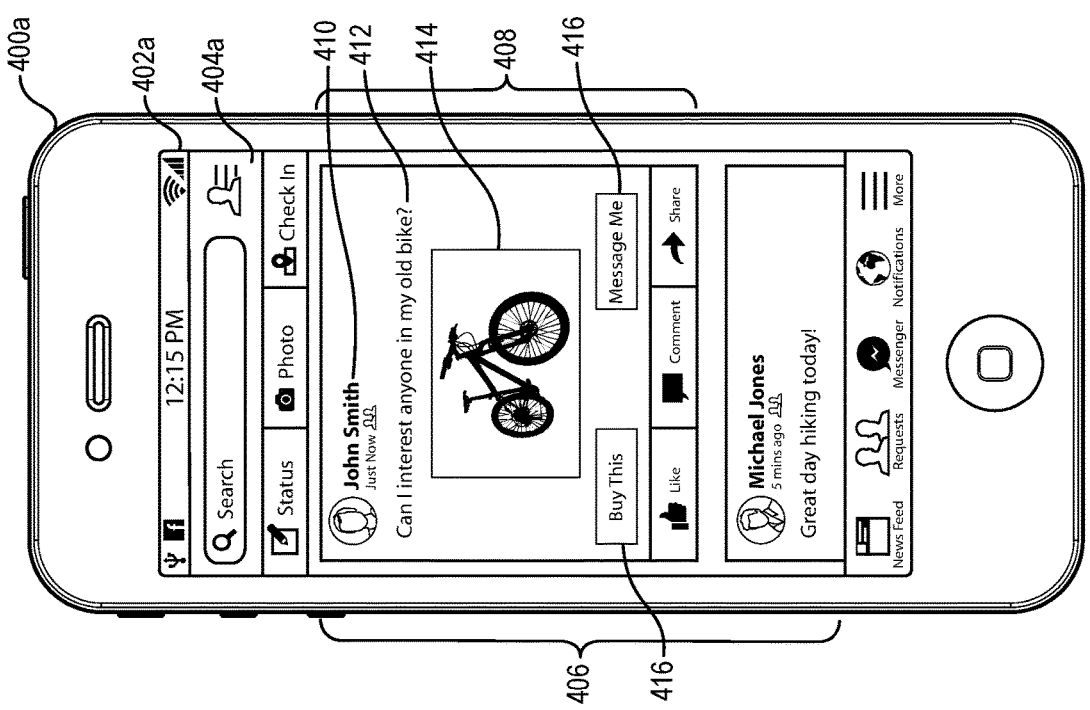

For example, FIGS. 4A-4H illustrate various views of GUIs provided at the client computing devices 102*a*, 102*b*, 102*c*, or 102*d* by way of the social networking application 104. As mentioned above, in some embodiments, a client computing device (i.e., the client computing device 102*a*, 102*b*, 102*c*, or 102*d*) can implement part of all of the system 100. For example, FIG. 4A illustrates a computing device 400*a* of a potential product buyer (i.e., user 110*a*, 110*b*, or 110*c*) that may implement one or more of the components or features of the messaging manager 106 and/or client computing devices 102*a*, 102*b*, or 102*c*. As shown, the computing device 400*a* is a handheld device, such as a mobile phone device (e.g., a smartphone). As used herein, the term "handheld device" refers to a device sized and configured to be held/operated in a single hand of a user. In additional or alternative examples, however, any other suitable computing device, such as, but not limited to, a tablet device, larger wireless device, laptop or desktop computer, a personal digital assistant device, and/or any other suitable computing device can perform one or more of the processes and/or operations described herein.

As illustrated in FIG. 4A, the computing device 400*a* includes a touch screen display 402*a* that can display user interfaces and by way of which user input may be received and/or detected. As used herein, a "touch screen display" refers to the display of a touch screen device. In one or more embodiments, a touch screen device may be a client computing device 102*a*, 102*b*, 102*c*, or 102*d* with at least one surface upon which a user may perform touch gestures (e.g., a laptop, a tablet computer, a personal digital assistant, a media player, a mobile phone) to provide user input. Additionally or alternatively, the computing device 400*a* may include any other suitable input device, such as a touch pad or those described below in reference to FIG. 7.

In FIG. 4A, the touch screen display 402*a* of the computing device 400*a* displays a newsfeed GUI 404*a* provided by the GUI manager 202 installed thereon. In one or more embodiments, the GUI manager 202 provides the newsfeed GUI 404*a* in order to display one or more social media posts from co-users associated with the user of the computing device 400*a* via the social networking system 104. For example, as shown in FIG. 4A, the newsfeed GUI 404*a* can include a newsfeed 406 containing at least one social media post 408. In additional or alternative embodiments, the newsfeed 406 can be scrollable, and can include various selectable elements.

In FIG. 4A, the embodiment illustrated includes the social media post 408 that is composed by a product seller (i.e., "John Smith" is the product seller) advertising a product for sale within the potential product buyer's newsfeed 406. After the product seller composes and submits the social media post 408 to the social networking system 104, the GUI manager 202 (e.g., as instructed by the social networking system 104) can display the social media post 408 within the potential product buyer's newsfeed 406. Additionally, the GUI manager 202 installed on a computing device associated with the product seller (i.e., the client computing device 102d) can also display (e.g., as instructed by the social networking system 104) the social media post 408 within a newsfeed associated with the seller. In that case, the GUI manager 202 may also display other controls associated with the social media post 408, that are meant only for the product seller, as will be described in more detail below.

In a social media feed associated with a potential product buyer, the social media post 408 can include information identifying the product seller. For example, as shown in FIG. 4A, the social media post 408 within the newsfeed 406 can include user information 410. In one or more embodiments, the user information 410 can include the seller's name (i.e., "John Smith"), a picture of the seller (i.e., a profile picture associated with the seller's social networking system profile), etc. In some embodiments, the seller information 410 can also include an indication as to how long ago the seller submitted the social media post 408 to the social networking system 104 (e.g., "Just Now"). In additional or alternative embodiments, the seller information 410 may be selectable. In that case, upon selection of the seller information 410, the GUI manager 202 may display a profile associated with the seller.

The social media post 408 can also include information related to a product being sold by the seller. For example, as shown in FIG. 4A, the social media post 408 may include a product description 412 as well as a product media 414 (e.g., a product image). In one or more embodiments, the product description 412 and the product media 414 can be composed and/or provided by the product seller to the social networking system 104. In some embodiments, the product media 414 is a digital photograph of the product. In additional or alternative embodiments, the product media 414 can be a digital video, a hyperlink to a webpage dedicated to the product, a sound file, or any other type of media. In an embodiment, the product media 414 can be selectable, such that in response to a detected interaction with the product media 414, the GUI manager 202 can provide an enlarged view of the product media 414, a separate graphical user interface dedicated to the product media 414, etc.

Furthermore, the social media post 408 can include one or more selectable input controls. For example, as shown in FIG. 4A, the social media post 408 can include a purchase control 416 (i.e., a "Buy This" button), and a message control 418 (i.e., a "Message Me" button). In one or more embodiments, upon a detected interaction with the purchase control 416, the messaging manager 106 can initialize one or more functions of the payment manager 212 in order to facilitate the purchase transaction. For instance, in response to a detected interaction with the purchase control 416, the payment manager 212 can provide one or more payment controls to the social networking application 112 such that a product purchaser can provide credit card details, checking account details, shipping details, etc. The payment manager 212 can then initiate a payment (e.g., through a payment network) to the seller or a deposit into an escrow account corresponding to the purchase.

In one embodiment, the GUI manager 202 may only display the purchase control 416 to within the newsfeed 406 of a social networking system user who the payment manager 212 has determined is within a tolerable risk level. For example, as described above, the payment manager 212 can analyze social networking activity information associated with a given user in order to determine a risk level associated with that user. The payment manager 212 may determine a high risk level for a user who regularly fails to pay for purchased products, skips payments, or has indicators of other fraudulent social networking system activity. In one embodiment, the payment manager 212 may also contact a third party system in order to determine a credit score associated with a given user. If the payment manager 212 determines a high risk level for a potential buyer of the product advertised in the social media post 408, the GUI manager 202 may not provide the purchase control 416 within the social media post 408.

In one or more embodiments, upon a detected interaction with the messaging control 418, the GUI manager 202 of the social networking app 112 installed on a client computing device associated with the potential product buyer (i.e., client computing device 102a) can provide a graphical user interface for the potential product buyer to compose a message to the product seller. For example, as shown in FIG. 4B, the GUI manager 202 can provide the messaging graphical user interface 404b within the touch screen display 402 of the computing device 400a. In one or more embodiments, the messaging graphical user interface 404b may be associated with the social networking app 112, and the social networking system 104, respectively. In additional or alternative embodiments, the messaging graphical user interface 404b may be associated with some third party application. In that case, the GUI manager 202 can provide the messaging graphical user interface 404b via a connection with the third party application.

In one embodiment, it is possible that the messaging graphical user interface 404b is part of a dedicated messaging application either separate from, or part of the social networking application 112. Accordingly, it is possible that the GUI manager 202 may require the potential buyer to install additional software before providing the messaging graphical user interface 404b. In that case, the social networking application 112 can prompt the potential buyer to install the needed software before continuing. After the potential buyer installs the software, the GUI manager 202 can provide the messaging graphical user interface 404b.

As shown in FIG. 4B, the GUI manager 202 can automatically provide an electronic message address 420 within the messaging graphical user interface 404b. In one or more embodiments, the electronic message address 420 indicates a recipient of any electronic message composed within the messaging graphical user interface 404b. For example, in response to the potential product buyer interacting with the message control 418 of the product seller's social media post 408, as shown in FIG. 4A, the GUI manager 202 can provide the electronic message address 420 for the product seller (e.g., "John Smith") as part of the messaging graphical user interface 404b, as shown in FIG. 4B. In one embodiment, the social networking application 112 can address any electronic message composed within the messaging graphical user interface 404b to the social networking system user associated with the electronic message address 420.

In one or more embodiments, the GUI manager 202 can provide a communication thread 422 within the messaging graphical user interface 404b. For example, the GUI manager 202 can include electronic messages sent and received by the social networking application 112 installed on the computing device 400a within the communication thread 422. In one embodiment, the GUI manager 202 organizes the communication thread 422 such that electronic messages sent from the computing device 400a are displayed along one side of the communication thread 422 within the touch screen display 402, and electronic messages received by at the computing device 400a are displayed along the other side of the communication thread 422 within the touch screen display 402. Furthermore, in one embodiment, the GUI manager 202 organizes the communication thread 422 such that newest electronic messages are added to the bottom of the communication thread 422, with oldest message displayed at the top of the communication thread 422. In an alternative embodiment, the GUI manager 202 may organize the communication thread 422 in any other manner so as to indicate both the origin and chronology of the electronic messages within the communication thread 422.

As mentioned above, in response to the potential product buyer interacting with the message control 418 of the product seller's social media post 408, the messaging manager 106 can provide a pre-populated electronic message 424 in order to help the product seller and the potential buyer quickly determine a product associated with the communication thread 422. Although the pre-populated electronic message 424 shown in FIG. 4B includes only a picture of the product described in the product seller's social media post 408 (i.e., the product media 414 from the social media post 408), the messaging manager 106 can include structured data along with the product media 414 as part of the pre-populated electronic message 424 to create a rich object for the pre-populated electronic message 424. For example, the pre-populated electronic message 424 may also include information such as, but not limited to, node and edge information associated with the social media post 408, profile information associated with the product seller, profile information associated with the potential buyer, etc. The messaging manager 106 can include all this structured data as part of the pre-populated electronic message 424, even though the GUI manager 202 only displays the product media 414 within the communication thread 422. In additional or alternative embodiments, the GUI manager 202 may display other portions of the structured data associated with the social media post 408 as part of the pre-populated electronic message 424 (i.e., the name of the product, the description of the product, etc.). In one embodiment, the pre-populated electronic message 424 is selectable, such that in response to a detected selection of the pre-populated electronic message 424, the GUI manager 202 can provide a separate GUI with further details related to the pre-populated electronic message 424 (i.e., the social media post 408, profile information for the product seller, etc.).

Also as mentioned above, the potential product buyer can utilize the messaging graphical user interface 404b to compose an electronic message associated with the pre-populated electronic message 424. For example, as shown in FIG. 4B, the messaging graphical user interface 404b can include a text input control 426, as well as additional input controls 428 and a touch screen keyboard 432. In one or more embodiments, the potential product buyer can input text in the text input control 426 (i.e., "How much would you take?") by utilizing the touch screen keyboard 432. Additionally or alternatively, as discussed above, the user input detector 204 associated with the computing device 400a can also detect sound inputs (i.e., talk-to-text inputs), or other types of inputs from the potential product buyer in order to compose an electronic message associated with the pre-populated electronic message 424.

The GUI manager 202 can provide other types of input options in response to a detected interaction with any of the additional input controls 428. For example, the GUI manager 202 can provide the touch screen keyboard 432 in response to a detected interaction with the input control 430a. Similarly, the GUI manager 202 may provide purchase input controls in response to a detected interaction with the input control 430b. As discussed above, the GUI manager 202 may only provide the input control 430b in response to a determination by the payment manager 212 that the potential buyer is within an acceptable risk level. Additionally or alternatively, in some embodiments, the GUI manager 202 may only provide the input control 430b in response to a determination by the messaging manager 106 that the communication thread 422 has commercial intent. In other words, the GUI manager 202 may only provide the input control 430b in response to determining that the communication thread 422 contains the pre-populated electronic message 424, contains purchase language, is between two social networking system users who have transacted a purchase previously, etc. Furthermore, the GUI manager 202 may provide a photograph input control, a media library input control, an emoticon input control or a thumbs-up input control in response to a detected interaction with input controls 430c, 430d, 430e, or 430f, respectively.

The potential product buyer can submit both the pre-populated electronic message 424 as well as the composed electronic message (i.e., the text message within the text input control 426) to the messaging manger 106 for delivery to the product seller (i.e., the social networking system user associated with the electronic message address 420). For example, the potential product buyer can submit the pre-populated electronic message 424 and the electronic message associated with the pre-populated electronic message 424 by tapping a return or send button on the touch screen keyboard 432. In additional or alternative embodiments, the potential product buyer can submit the pre-populated electronic message 424 and the electronic message associated with the pre-populated electronic message 424 in another way, such as by speaking a command, double-tapping the return button, etc.

As described above, in response to receiving a pre-populated electronic message and a electronic message associated with the pre-populated electronic message, the messaging manager 106 can organize and store a new communication thread associated with the potential buyer, the product seller, and the product, according to the structured data included with the pre-populated electronic message. Accordingly, in one or more embodiments, the GUI manager 202 of the social networking application 112 installed on a computing device associated with the product seller (i.e., client computing device 102d) can utilize this communication thread information in order to organize one or more messaging graphical user interfaces for the product seller. For example, as shown in FIG. 4C, the GUI manager 202 can organize communication threads based on given products within a product listing graphical user interface 404c displayed within the touch screen display 402b associated with the product seller's computing device 400b.

Figure 4D:
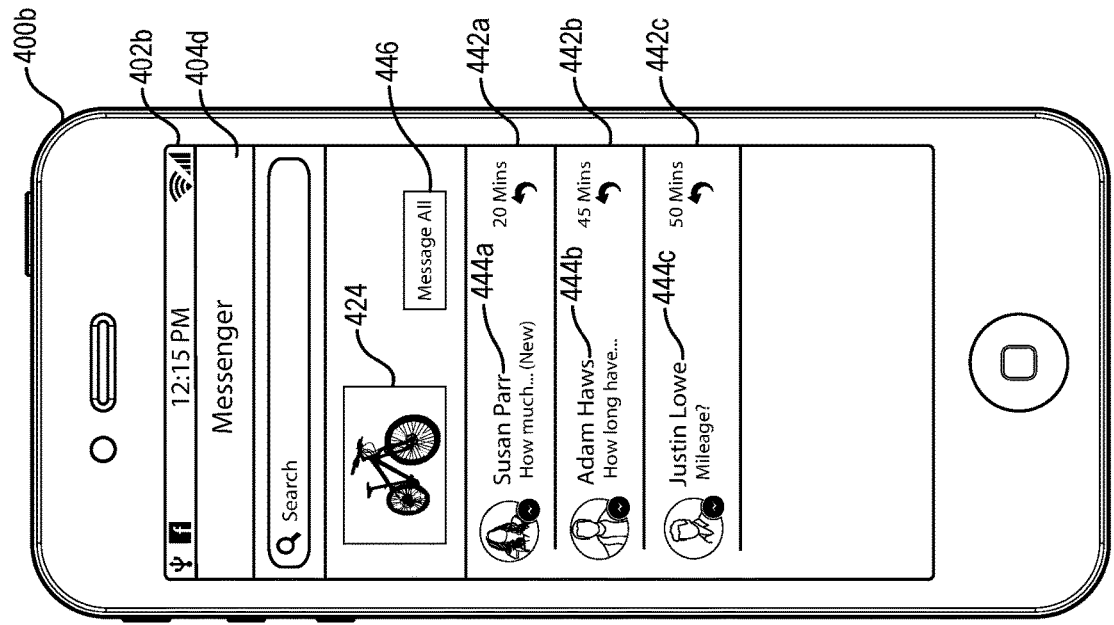
Figure 4C:
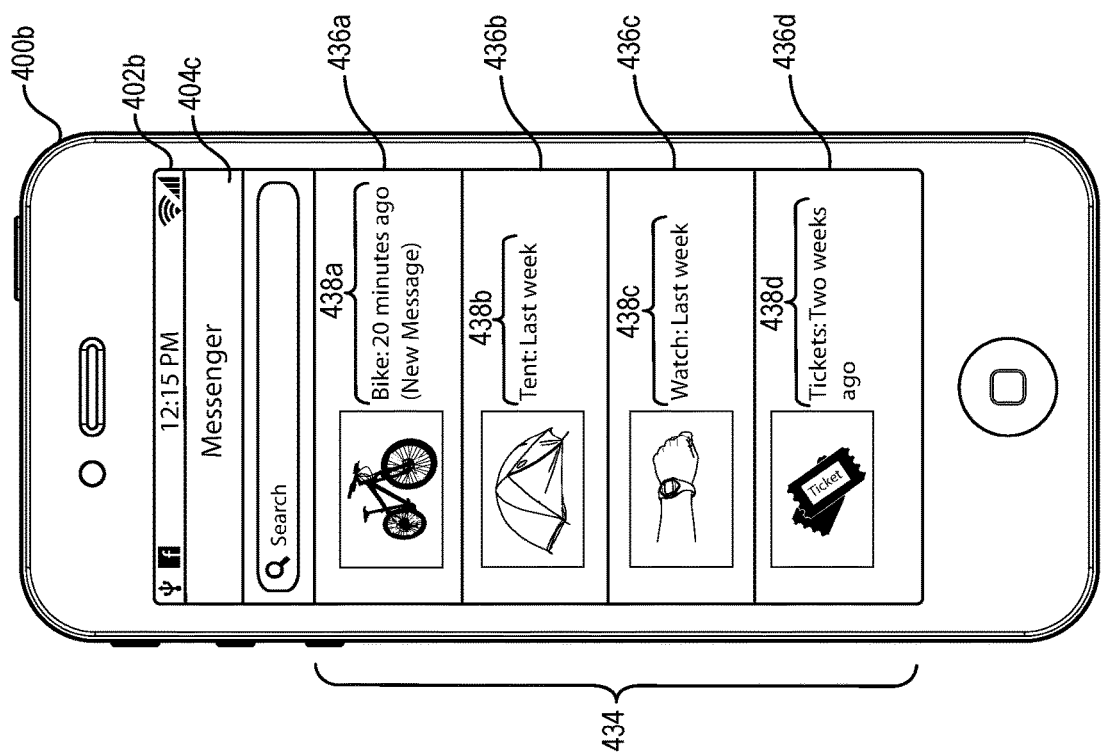

As illustrated in FIG. 4C, the GUI manager 202 can include a product message list 434 within the product listing graphical user interface 404c. In one or more embodiments, the product message list 434 can include one or more product communication thread groups 436a-436d. For example, in one embodiment, each product communication thread group 436a, 436b, 436c, and 436d is representative of a sub-listing of communication threads between the seller and one or more potential buyers, wherein each communication thread in the sub-listing is related to the product denoted by the product communication thread group 436a, 436b, 436c, or 436d. To illustrate, in response to a detected interaction with the product communication thread group 436a (i.e., where the product is a bike), the GUI manager 202 may provide another graphical user interface to the product seller that lists every communication thread that includes the seller and is related to the bike.

In one embodiment, each product communication thread group 436a-436d can also include a thread summary 438a, 438b, 438c, or 438d, respectively. The thread summaries 438a-438d can include information that serves to orient the product seller to the product associated with the product communication thread groups 436a-436d, as well as to inform the product seller regarding when the communication threads associated with each product communication thread group 436a-436d were last active. For example, the thread summary 438b informs the product seller that the communication threads represented by the product communication thread group 436b are focused on the "Tent," and that at least one of those communication threads was last active "Last week." The thread summary 438a, 438b, 438c, or 438d can also notify the product seller if there is a new (i.e., unread) electronic message in any communication thread represented by the product communication thread groups 436a-436d. For example, the thread summery 438a includes the indicator "New Message" to inform the product seller that there is a new electronic message in one of the communication threads represented by the product communication thread group 436a.

As mentioned above, in response to a detected interaction with one of the product communication thread groups 436a-436d, the GUI manager 202 associated with the computing device 400b can provide a graphical user interface listing individual communication threads associated with a particular product communication thread group. For example, in response to the product seller tapping the product communication thread group 436a, the GUI manager 202 can provide the potential buyer graphical user interface 404d on the touch screen display 402b of the computing device 400b, as illustrated in FIG. 4D. As shown in FIG. 4D, the potential buyer graphical user interface 404d can include a potential buyer thread list 440, along with the pre-populated electronic message 424. As described above, the GUI manager 202 can provide the pre-populated electronic message 424 within the potential buyer graphical user interface 404d in order to provide the product seller with context for all the communication threads listed therein. In one embodiment, the pre-populated electronic message 424 can be selectable such that the GUI manager 202 provides a more full product description in response to a detected interaction with the pre-populated electronic message 424.

The potential buyer thread list 440 can include one or more potential buyer communication threads 442a-442c. For example, as shown in the embodiment illustrated in FIG. 4D, the product communication thread group 436a associated with the bike (e.g., as specified by the pre-populated electronic message 424) contains three potential buyer communication threads 442a, 442b, and 442c. Each of the potential buyer communication threads 442a, 442b, and 442c is between the product seller and a potential buyer, and is related to the bike. In other words, each of the potential buyer communication threads 442a, 442b, and 442c was initiated when the potential buyer associated with each potential buyer communication thread 442a-442c tapped the "Message Me" button included with the social media post 408, and is organized according to the pre-populated electronic message 424 included therein.

In some embodiments, each potential buyer communication thread 442a-442c includes a potential buyer summary. For example, as shown in FIG. 4D, the GUI manager 202 can display a potential buyer summary 444a, 444b, or 444c in association with the potential buyer communication thread 442a, 442b, or 442c, respectively. Each potential buyer summary 444a-444c can include profile information associated with the potential buyer who began the communication thread (i.e., the potential buyer's name and/or profile picture). In one or more additional embodiments, each potential buyer summary 444a-444c can also include an indication as to how long ago the last message was sent by either the potential buyer or by the product seller (e.g., "20 mins," "45 mins," "50 mins"), as well as at least a portion of the last electronic message sent in the communication thread (e.g., "How much . . . ," "How long have . . . ," "Mileage?"). Furthermore, in some embodiments, a potential buyer summary can also include an indicator informing the product seller that a new message exists in a particular communication thread (e.g., "New").

Although a particular arrangement of lists (i.e., the product message list 434) and sub-lists (i.e., the potential buyer communication thread 440), the GUI manager 202 may provide an alternative organization of the information presented therein. For example, in another embodiment (not shown), the GUI manager 202 may not provide the product message list 434, but rather may only provide the potential buyer communication thread 440. In that case, the GUI manager 202 may group potential buyer communication threads based on the common products discussed therein. Additionally or alternatively, the GUI manager 202 may provide a picture of the product (i.e., taken from the pre-populated electronic message 424) as part of each potential buyer communication thread that is related to that particular product.

In one or more embodiments, the potential buyer graphical user interface 404d can also include a broadcast message control. For example, as shown in FIG. 4D, the GUI manager 202 can provide the broadcast message control 446 (e.g., the "Message All" button) within the potential buyer graphical user interface 404d. In one or more embodiments, the broadcast message control 446 allows the product seller to compose a single message that the messaging manager 106 delivers to each potential buyer associated with the potential buyer communication threads 442a-442d in the potential buyer thread list 440. In some embodiments, in response to a detected interaction with the broadcast message control 446, the GUI manager 202 may provide a separate graphical user interface for composing the broadcast message. Alternatively, in response to a detected interaction with the broadcast message control 446, the GUI manager 202 may provide a text input control within the potential buyer graphical user interface 404d.

Although FIGS. 4C and 4D illustrate how the messaging manager 106 and the social networking application 112 work together to provide organized lists of communication threads to a product seller, it should be noted that the message manager 106 and the social networking application 112 can also provide the same organization to a potential product buyer. For example, in one embodiment, the GUI manager 202 associated with a computing device of a potential product buyer can organize a product listing graphical user interface for the potential product buyer that groups communication threads according to various products regarding which the potential product buyer has contacted product sellers. Additionally, or alternatively, the GUI manager 202 associated with the computing device of the potential product buyer can further organize the communication threads based on each product seller contacted by the potential product buyer.

As mentioned above, in response to a detected selection of one of the potential buyer communication threads 442a-442c, the GUI manager 202 can provide the product seller's messaging graphical user interface including the communication thread referenced by the selected potential buyer communication thread 442a, 442b, or 442c. For example, as shown in FIG. 4E, in response to the product seller's detected selection of the potential buyer communication thread 442a, the GUI manager 202 can provide the messaging graphical user interface 404b' associated with the product seller on the touch screen display 402b of the seller's computing device 400b. Also as shown in FIG. 4E, the GUI manager 202 can provide the communication thread 422' between the product seller and the potential buyer (i.e., "Susan" as indicated by the electronic message address 420'). It should be noted that the potential buyer "Susan" illustrated in FIG. 4E is the same as the potential buyer who utilizes the computing device 400a in FIGS. 4A and 4B. Accordingly, the beginning of the communication thread 422' between the product seller and the potential buyer starts with the pre-populated electronic message 424 and the electronic message associated with the pre-populated electronic message, sent by the potential buyer (i.e., "How much would you take?" as illustrated in FIG. 4B).

Following the initial receipt at the computing device 400b of the pre-populated electronic message 424 and the electronic message associated with the pre-populated electronic message 424, the product seller can respond to the potential product buyer with one or more electronic messages. For example, as shown in FIG. 4E, in response to the initial pre-populated electronic message 424 and the electronic message associated with the pre-populated electronic message 424 (i.e., "How much would you take?"), the product seller responds with an electronic message (i.e., "I'm offering this bike for $150."). The embodiment illustrated in FIG. 4E also includes a further response electronic message 448 from the potential product buyer (i.e., "I'll take it!").

As described above, the messaging manager 106 can detect purchase events within a social networking system newsfeed or within a communication thread. The messaging manager 106 can then perform one of a variety of actions in response to the detected purchase event. In one or more embodiments, a purchase event that the messaging manager 106 can detect within a communication thread can be an electronic message featuring transactional language that is final in its tone. For example, as illustrated in FIG. 4E, the messaging manager 106 can recognize the electronic message 448 (i.e., "I'll take it!") as containing transactional language. In response to determining the electronic message 448 is a purchase event, the messaging manager 106 can perform actions such as, but not limited to, deleting the social media post associated with the pre-populated electronic message 424 from all newsfeeds, updating the social media post associated with the pre-populated electronic message 424 in all newsfeed to include an indicator that the product is about to be sold, sending an electronic message to the product seller (e.g., via the social networking system 104, or via an email, SMS text, etc.), and so forth. As described above, the messaging manager 106 may take the social networking activity information associated with both the potential buyer and the product seller into account in order to determine what kinds of language qualify as a purchase event.

Additionally or alternatively, in response to detecting a purchase event between a particular potential buyer and the product seller, the messaging manager 106 can generate an invoice for the sale of the product. For example, as shown in FIG. 4E, in response to the purchase event detected in the electronic message 448, the messaging manager 104 can automatically generate an invoice 450. In one or more embodiments, the messaging manager 104 can deliver the invoice 450 to the potential product buyer as a file attached to an electronic message and/or available by way of the communication thread 422'. Additionally or alternatively, the messaging manager 104 can deliver the invoice 450 to the potential product buyer via an email or SMS text message. The invoice 450 may be an electronic file, or a link to a separate graphical user interface. In one embodiment, the invoice 450 can contain information taken from the structured data associated with the social media post 408 (e.g., the product description and product picture, etc.) as well as other transaction information that can be configured by the product seller, such as, but not limited to, product sellers business name and address, the seller's preferred method of payment, etc. The invoice 450 illustrated in FIG. 4E can be selectable and downloadable by the potential buyer. Alternatively, in one embodiment, the invoice 450 generated by the messaging manager 106 may simply be text that is included in an electronic message.

In some embodiments, rather than allowing the messaging manager 106 to automatically delete or update the social media post 408, the product seller can manually manage the social media post 408. For example, as shown in FIG. 4F, messaging manager 106 can display the social media post 408' within the newsfeed 406' of the newsfeed graphical user interface 404a' displayed on the touch screen display 402b of a computing device 400b associated with the product seller. In one or more embodiments, the messaging manager 106 may include the same information included in the social media post 408 provided to potential product buyers (i.e., the seller information 410', the product description 412', and the product media 414'), but may also provide additional controls specifically for the product seller. For example, the messaging manager 106 can provide a sold control 452 as well as a delete control 454 associated with the social media post 408' only to the product seller.

In one or more embodiments, the messaging manager 106 provides the delete control 454 (i.e., the "remove post" button) in order to enable the product seller to remove the social media post 408' from all newsfeeds. For example, in response to a detected interaction with the delete control 454, the messaging manager 106 can update the newsfeeds of every social networking system user who is associated with the product seller to remove all instances of the social media post 408'. In other words, the messaging manager 106 would update the newsfeeds of each co-user or group member associated with the product seller such that each co-user or group member would no longer be able to see or find the social media post 408' within their newsfeeds. In other embodiments, in response to a detected interaction with the delete control 454, the messaging manager 106 may simply disable the various controls associated with all the instances of social media post 408' across all co-user's newsfeeds (i.e., such as the purchase control 416 and the message control 418 illustrated in FIG. 4A).

In one or more embodiments, the messaging manager 106 provides the sold control 452 (i.e., the "Mark as Sold" button) in order to enable the product seller to indicate that the product advertised in the social media post 408' is no longer available. For example, as shown in FIG. 4F, in response to a detected interaction with the sold control 452, the messaging manager 106 can update every instance of the social media post 408' to indicate that the product is no longer available. Additionally or alternatively, in response to a detected interaction with the sold control 452, the messaging manager 106 can update the structured data associated with the social media post 408' to indicate that the product is no longer available.

In an additional embodiment, in response to a detected interaction with the sold control 452 and/or in response to a request from the product seller, the messaging manager 106 can send a sold notification to one or more potential product buyers who have started communication threads with the product seller with regard to the product advertised in the social media post 408'. For example, as described above with reference to FIG. 4D, the product seller received electronic messages from three potential buyers (i.e., "Susan Parr," "Adam Haws," and "Justin Lowe"). Than as described above with reference to FIG. 4E, the product was purchased by one of these potential buyers (i.e., "Susan Parr"). Accordingly, in response to a detected interaction with the sold control 452, the messaging manager 106 can send a sold notification to the other potential buyers (i.e., "Adam Haws" and "Justin Lowe").

Additionally, in response to a detected interaction with the sold control 452, the messaging manager 106 may prompt the product seller for additional information. For example, in one embodiment, in response to a detected interaction with the sold control 452, the messaging manager 106 can prompt the product seller for information such as the name of the product buyer, the cost of the product, the amount of time the product was advertised before it was sold, etc. The messaging manager 106 may prompt the product seller for this information in order to update the structured data associated with the social media post 408', or simply for the purpose of tracking metrics internally.

In some embodiments, the messaging manager 106 can incentivize the product seller to mark a product as sold. For example, in one or more embodiments, the messaging manager 106 may provide a seller score associated with a product seller that reflects to the general membership of the social networking system 104 how many products the product seller advertises, how many products the product seller sells, and how well the product seller handles the purchase transactions. In that case, in order to maintain a good score, the product seller would be incentivized to mark as sold each product that the product seller successfully sells.

Figure 4H:
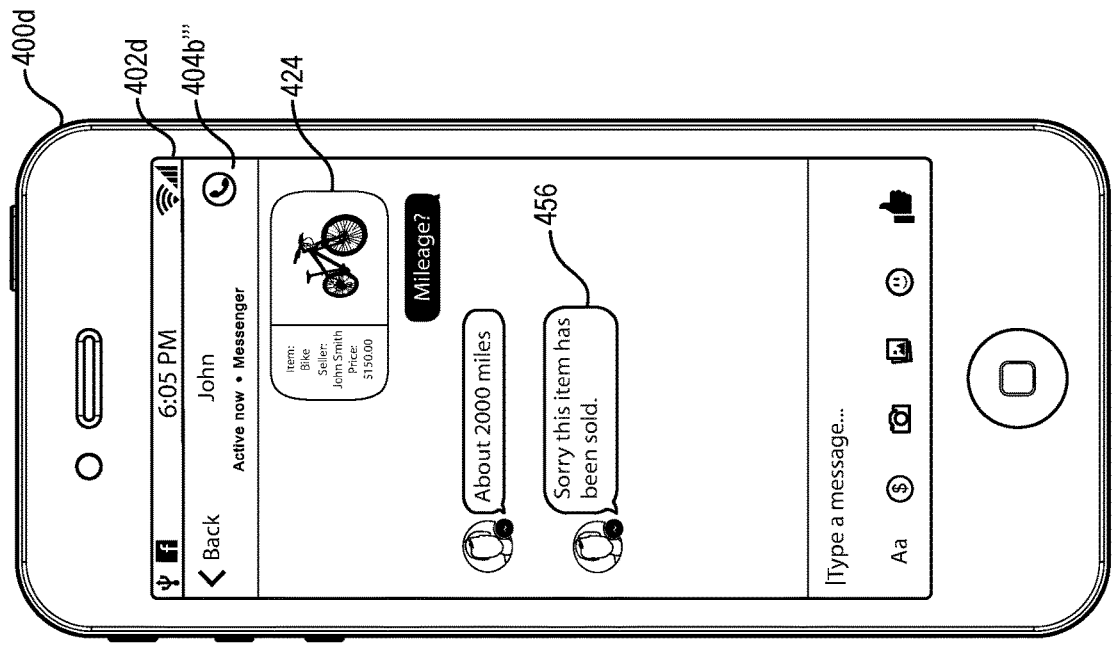
Figure 4G:
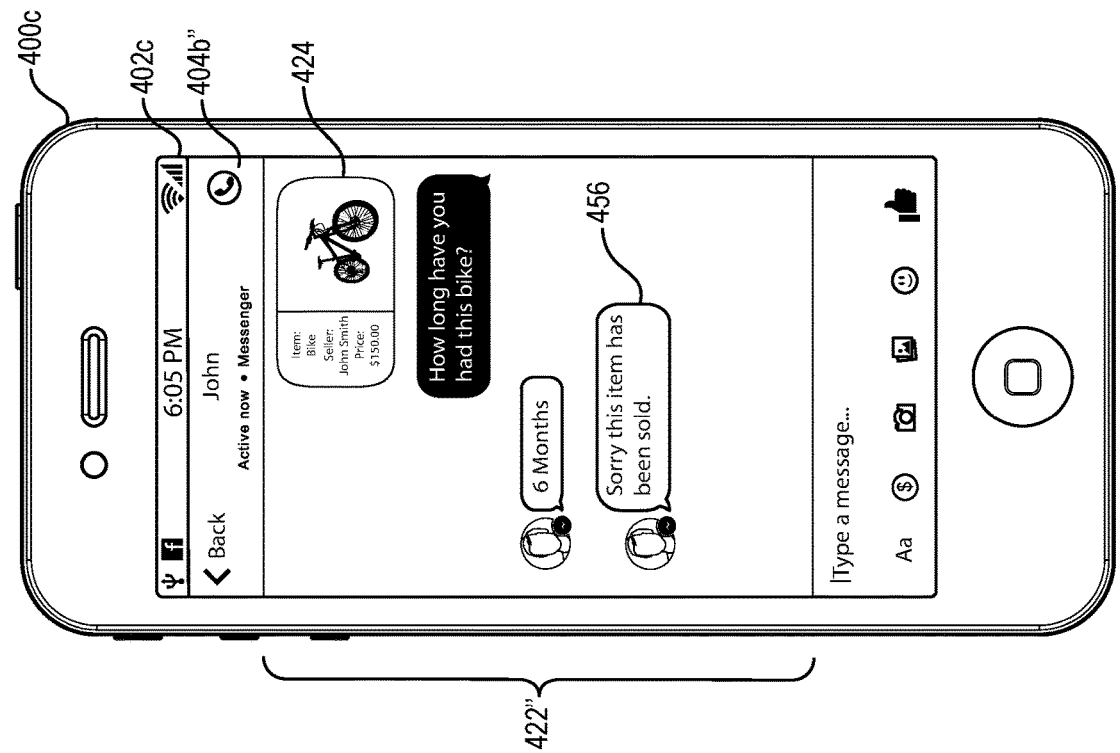

For example, FIGS. 4G and 4H illustrate communication threads 422" and 422''' within the messaging graphical user interfaces 404b" and 404b''' on the touch screen displays 402c and 402d of the computing devices 400c (e.g., which may represent computing device 102b) and 400d (e.g., which may represent computing device 102c), respectively (e.g., wherein the computing device 400c may be associated with user 110b, "Adam Hawes," and the computing device 400d may be associated with user 110c, "Justin Lowe"). As shown in FIGS. 4G and 4H, the messaging manager 106 and the social networking application 112 work together to organize the communication threads 422" and 422''' according to the pre-populated electronic message 424 and/or interactions with the product seller. In response to the detected interaction with the sold control 452, as shown in FIG. 4F, the purchase event, as shown in FIG. 4E, or an interaction with the input control 430b, as shown in FIG. 4B, the messaging manager 106 can generate the sold notification 456 illustrated in FIGS. 4G and 4H. In one or more embodiments, the messaging manager 106 can also add the sold notification 456 to each of the communication threads 422" and 422'''.

In one embodiment, the messaging manager 106 may also provide a notification via the social networking application 112 installed on both the computing device 400d and the computing device 400d. For example, in some embodiments, the potential buyer and/or the product seller may be inactive within a communication thread for long periods of time. In that case, the messaging manager 106 can provide a notification (e.g., a push notification, an email notification, a pop-up message, an SMS text message, etc.) informing the potential buyer that a product the potential buyer was interested in is no longer available.

Additionally, once a product has been sold, the messaging manager 106 may manage any further electronic messages related to the product, without any further input from the product seller. For example, in response to receiving an electronic message related to a social media post featuring a product that has already been sold, the messaging manager 106 can automatically reply to the received electronic message with a reply such as, "Sorry, this product is no longer available." In one or more embodiments, the product seller can configure this automatic reply. In this way, the product seller is not bothered by electronic messages that are related to a product that the seller no longer has for sale.

FIGS. 1-4H, the corresponding text, and the examples, provide a number of different methods, systems, and devices for managing electronic messages via a social networking system. In addition to the foregoing, embodiments can also be described in terms of flowcharts comprising acts and steps in a method for accomplishing a particular result. For example, FIGS. 5-6 may be performed with less or more steps/acts or the steps/acts may be performed in differing orders. Additionally, the steps/acts described herein may be repeated or performed in parallel with one another or in parallel with different instances of the same or similar steps/acts.

Figure 5:
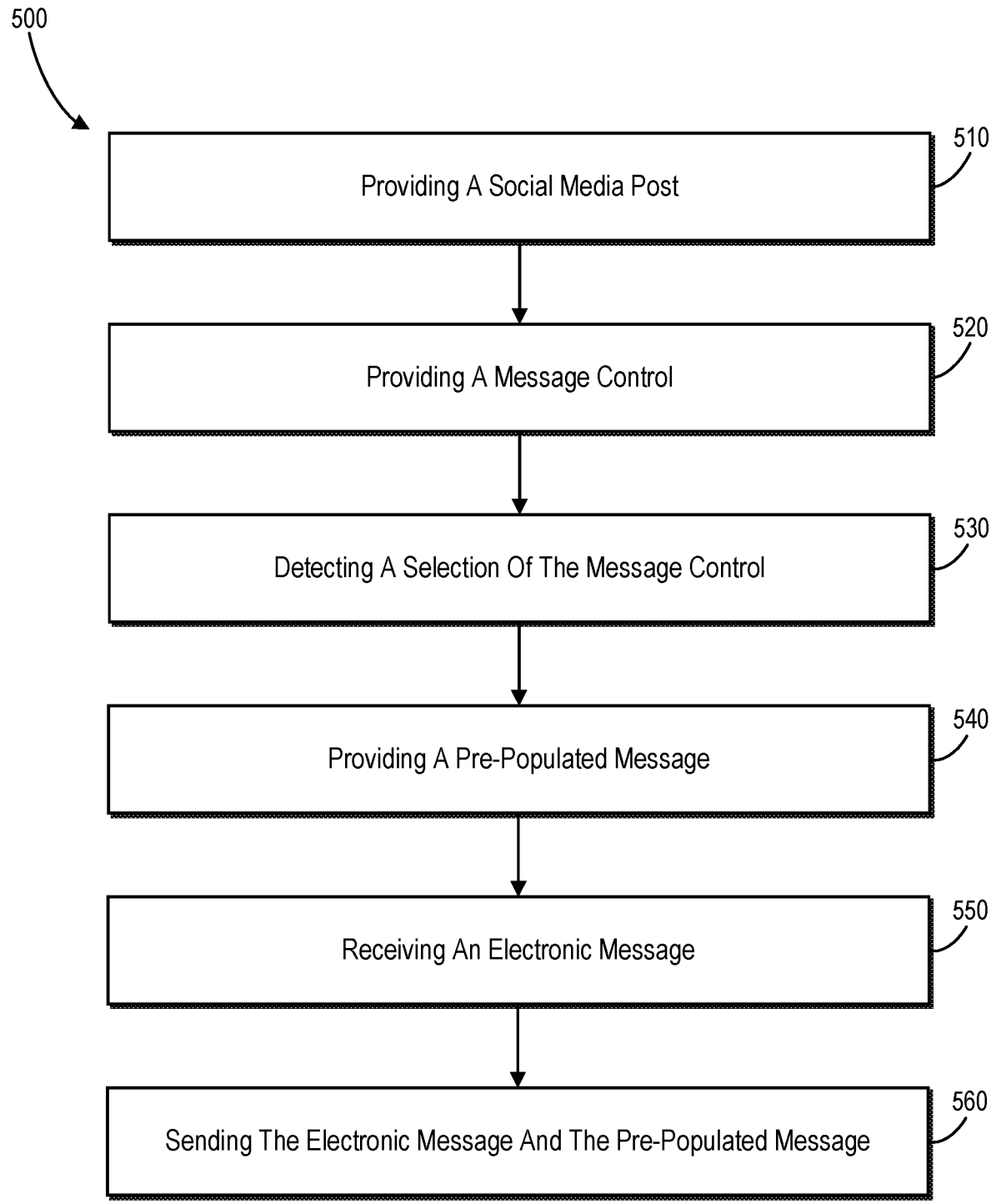
FIG. 5 illustrates a flowchart of a series of acts in a method of managing electronic messages via a social networking system in accordance with one or more embodiments.

FIG. 5 illustrates a flowchart of one example method 500 of managing electronic messages via a social networking system. The method 500 includes an act 510 of providing a social media post. In particular, the act 510 can involve providing a social media post 408 to a first user, wherein the social media post 408 is associated with a second user and comprises structured data (i.e., as part of the pre-populated electronic message 424) associated with a product being sold by the second user. In one or more embodiments, providing the social media post 408 to a first user further includes providing data associated with the second user.

The method 500 further includes an act 520 of providing a message control. In particular, the act 520 can involve providing a message control 416 associated with the social media post 408. In one or more embodiments, providing a message control 416 associated with the social media post 408 further includes providing a selectable message button within a graphical user interface.

Additionally, the method 500 includes an act 530 of detecting a selection of the message control. In particular, the act 530 can involve detecting a selection of the message control 416 by the first user. In one or more embodiments, detecting a selection of the message control 416 by the first user can include detecting a touch gesture selection of a selectable message button with a graphical user interface 404a.

Furthermore, the method 500 also includes an act 540 of providing a pre-populated electronic message. In particular, the act 540 can involve providing, in response to the detected selection of the message control 416 and to the first user, a pre-populated electronic message 424, wherein the pre-populated electronic message 424 comprises at least a portion of the structured data associated with the product. In one or more embodiments, providing, to the first user, a pre-populated electronic message 424 further comprises providing, to the first user, the pre-populated electronic message 424 within a dedicated messaging application. In one embodiment, providing, to the first user, the pre-populated electronic message 424, wherein the pre-populated electronic message 424 comprises at least a portion of the structured data associated with the product can occur automatically and without human intervention.

Additionally, the method 500 includes an act 550 of receiving an electronic message. In particular, the act 550 can involve receiving, from the first user, an electronic message associated with the pre-populated electronic message 424. In one or more embodiments, receiving, from the first user, the electronic message associated with the pre-populated electronic message comprises receiving the electronic message via the dedicated messaging application.

The method 500 also includes an act 560 of sending the electronic message and the pre-populated electronic message. In particular, the act 560 can involve sending, to the second user, the electronic message and the pre-populated electronic message 424. In one or more embodiment, sending, to the second user, the electronic message and the pre-populated electronic message 424 comprises sending the electronic message and the pre-populated electronic message 424 to a dedicated messaging application associated with the second user.

The method 500 can also include an act of maintaining the electronic message and the pre-populated electronic message 424 as part of a communication thread 422 between the first user and the second user. Furthermore, the method 500 can further comprise adding the communication thread 422 between the first user and the second user to a maintained plurality of communication threads (e.g., potential buyer communication threads 442a, 442b, 442c) associated with the second user, the social media post, and the plurality of other users. In one or more embodiments, the method 500 also includes the steps of receiving, from the second user, a broadcast electronic message 456 related to the social media post, and adding the broadcast electronic message 456 related to the social media post to the maintained plurality of communication threads (e.g., as shown in FIGS. 4G and 4H). Additionally, in one embodiment, the method 500 can also include providing a notification related to the broadcast electronic message to the first user and the plurality of users.

Figure 6:
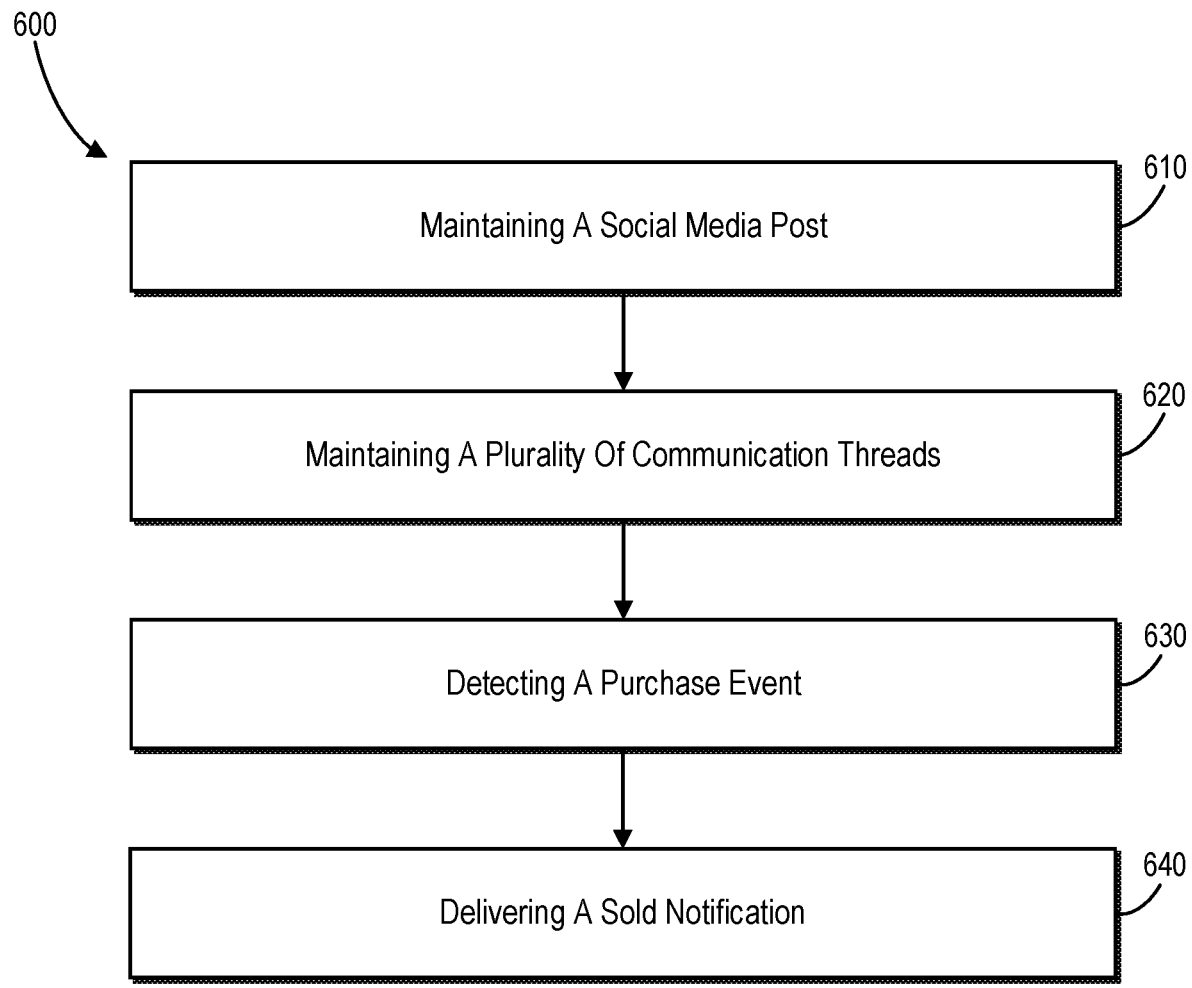
FIG. 6 illustrates a flowchart of a series of acts in a method of managing electronic messages via a social networking system in accordance with one or more embodiments.

FIG. 6 illustrates a flowchart of one example method 600 of managing electronic messages via a social networking system. The method 600 includes an act 610 of maintaining a social media post. In particular, the act 610 includes an act of maintaining a social media post, wherein the social media post comprises structured data associated with a product being sold by a seller. In one or more embodiments, the structured data further comprises data associated with the seller.

The method 600 further includes an act 620 of maintaining a plurality of communication threads. In particular, the act 620 can include maintaining a plurality of communication threads, wherein each of the plurality of communication threads references the social media post and is associated with the seller and one of the plurality of potential buyers. In one embodiment, maintaining a plurality of communication threads further comprises maintaining the plurality of communication threads first according to the product being sold by the seller (i.e., product communication thread groups 436a-436d), and second according to one of the plurality of potential buyers (i.e., potential buyer communication threads 442a-442c). Furthermore, in one embodiment, maintaining a plurality of communication threads can be accomplished automatically without human intervention.

Furthermore, the method 600 includes an act 630 of detecting a purchase event. In particular, the act 630 can include detecting a purchase event associated with the social media post and a particular potential buyer from the plurality of potential buyers. In one or more embodiments, detecting a purchase event includes at least one of detecting a sending of an electronic message containing language indicating a purchase (e.g., as in electronic message 448) between the seller and the particular potential buyer, detecting a selection of a purchase control 416 by the particular potential buyer, detecting a sending of a product invoice 450 by the seller, or detecting a selection of a mark as sold button (i.e., the sold control 452) by the seller. In one embodiment, detecting a purchase event associated with the social media post and a particular potential buyer from the plurality of potential buyers can be accomplished automatically without human intervention.

The method 600 also includes an act 640 of delivering a sold notification. In particular, the act 640 can involve delivering a sold notification 456 to each of the plurality of potential buyers not including the particular potential buyer, wherein the sold notification 456 references the social media post 408 and the seller associated with the social media post. In one or more embodiments, the act 640 can further comprise, in response to delivering the sold notification to each of the plurality of potential buyers not including the particular potential buyer, updating the social media post 408 to reflect the purchase event. In one embodiment, updating the social media post comprises updating the structured data of the social media post 408 to further include data associated with the particular potential buyer. Additionally, in one embodiment, delivering the sold notification 456 to each of the plurality of potential buyers not including the particular potential buyer further comprises delivering the sold notification 456 within a dedicated messaging application.

Furthermore, the method 600 can also include providing a notification related to the sold notification 456 to each of the plurality of potential buyers not including the particular potential buyer. Additionally, the method 600 can include receiving, from a user, a new electronic message regarding the social media post addressed to the seller, identifying a reply for the new electronic message, wherein the reply comprises language informing the user that the product associated with the social media post 408 is no longer for sale, and sending the identified reply to the user. Finally, in one embodiment, identifying the reply comprises identifying a pre-configured reply provided by the seller, or identifying an automatically generated reply.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
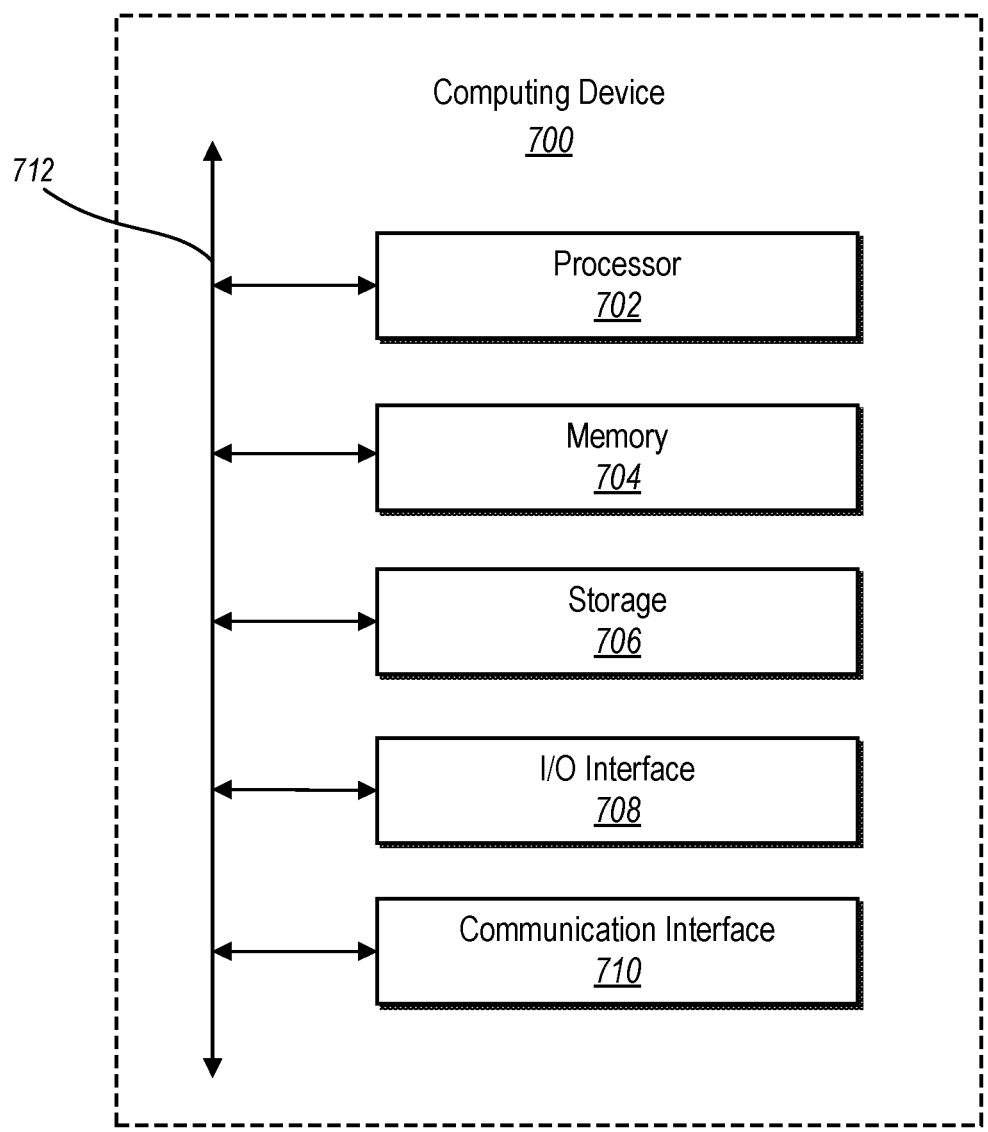
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 8:
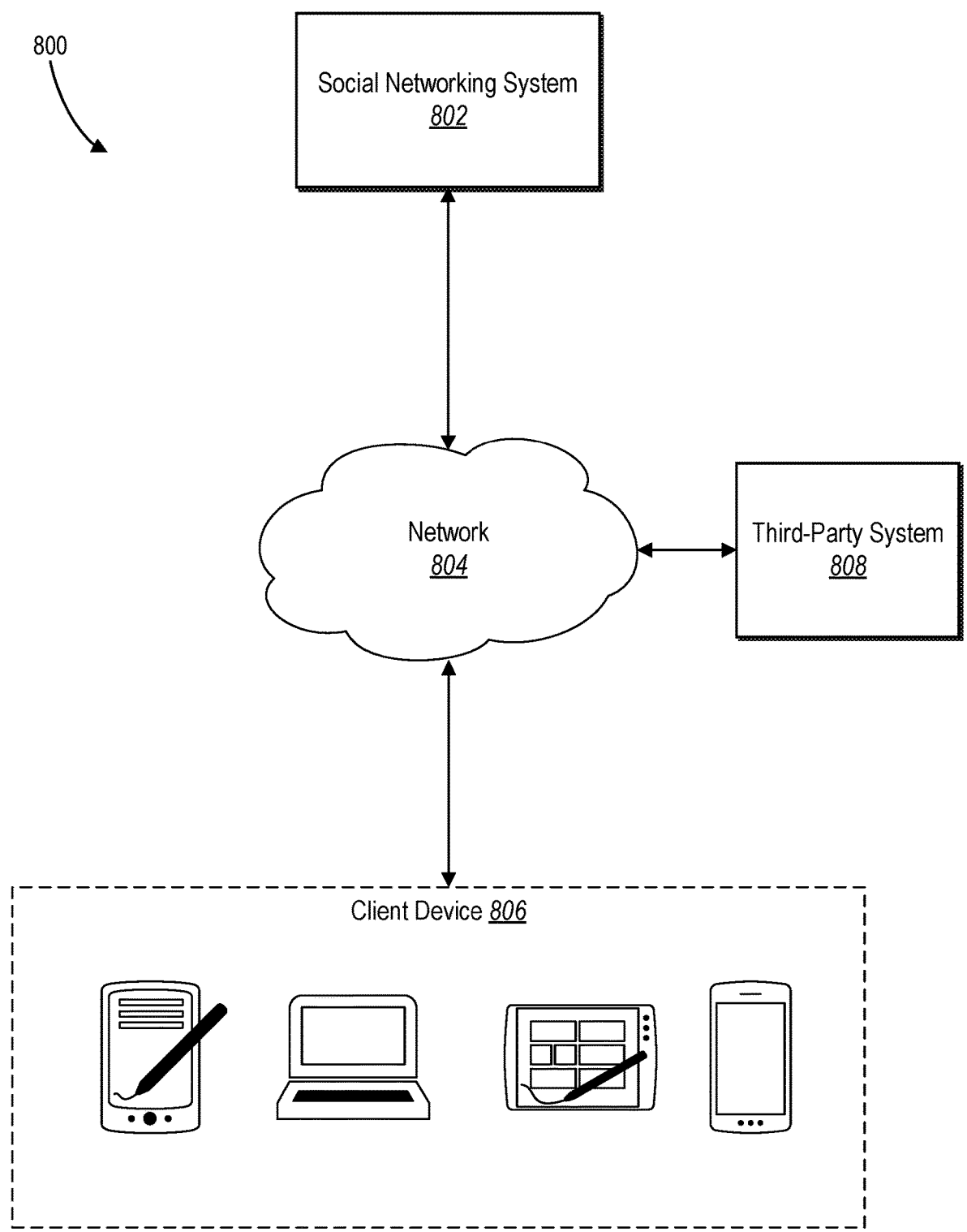
FIG. 8 is an example network environment of a social networking system in accordance with one or more embodiments.

FIG. 8 illustrates an example network environment 800 of a social-networking system. Network environment 800 includes a client system 806, a social-networking system 802, and a third-party system 808 connected to each other by a network 804. Although FIG. 8 illustrates a particular arrangement of client system 806, social-networking system 802, third-party system 808, and network 804, this disclosure contemplates any suitable arrangement of client system 806, social-networking system 802, third-party system 808, and network 804. As an example and not by way of limitation, two or more of client system 806, social-networking system 802, and third-party system 808 may be connected to each other directly, bypassing network 804. As another example, two or more of client system 806, social-networking system 802, and third-party system 808 may be physically or logically co-located with each other in whole or in part. Moreover, although FIG. 8 illustrates a particular number of client systems 806, social-networking systems 802, third-party systems 808, and networks 804, this disclosure contemplates any suitable number of client systems 806, social-networking systems 802, third-party systems 808, and networks 804. As an example and not by way of limitation, network environment 800 may include multiple client system 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social-networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 806. A client system 806 may enable a network user at client system 806 to access network 804. A client system 806 may enable its user to communicate with other users at other client systems 806.

In particular embodiments, client system 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client system 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client systems 806 or one or more third-party system 808 via network 804. The web server may include a mail server or other messaging functionality for receiving and routing messages between social-networking system 802 and one or more client systems 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
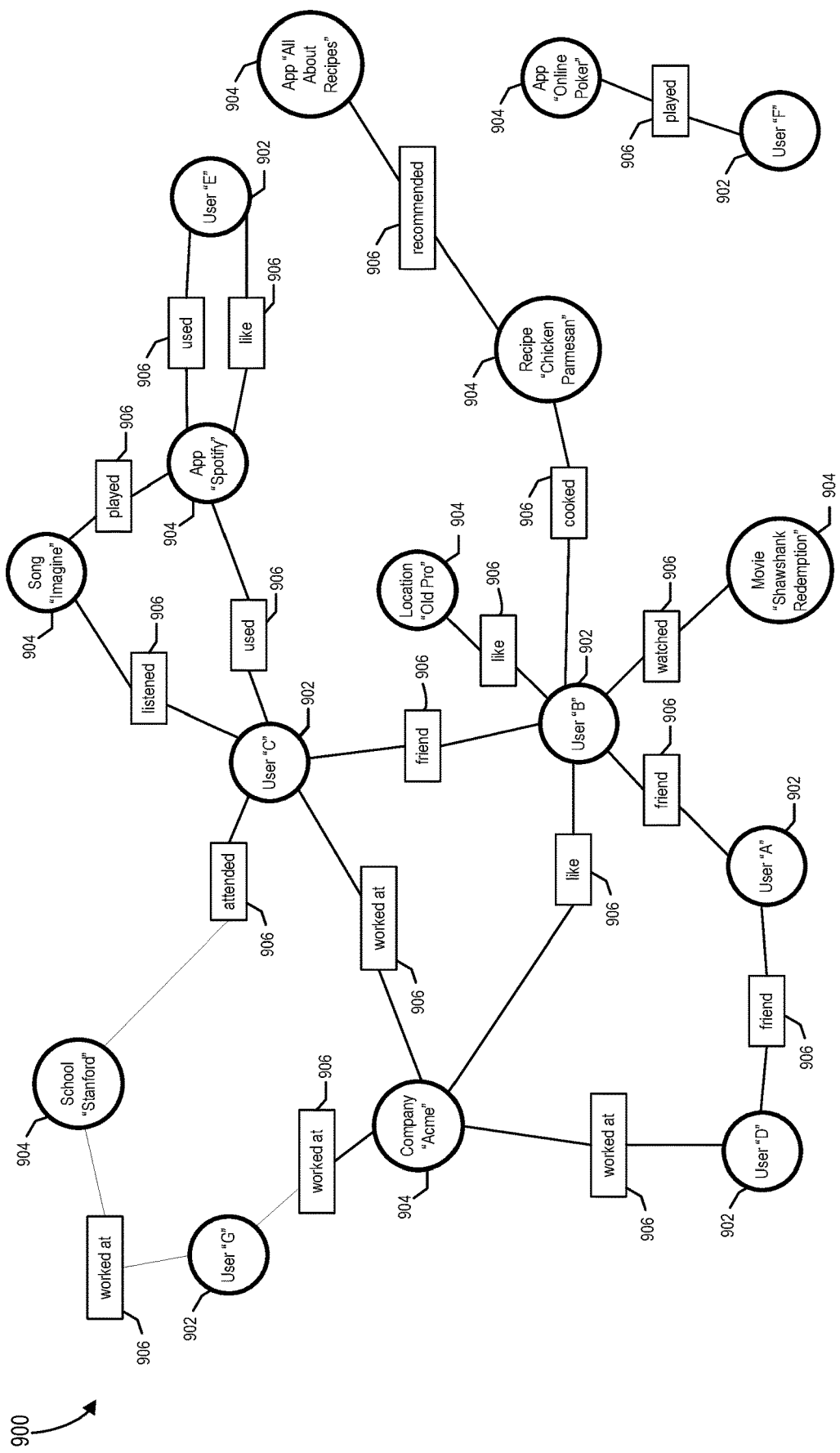
FIG. 9 illustrates a social graph in accordance with one or more embodiments.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   providing, by a social networking system and within a social networking application newsfeed customized for a first user for display on a touch screen display of a mobile device, a structured for-sale social media post from a second user, the structured for-sale social media post comprising a message control;
   in response to a detected selection of the message control by the first user, changing a display focus of the touch screen display from the social networking application to a separate messaging application; and
   providing, in response to the changed display focus, a pre-populated electronic message within the separate messaging application comprising at least a portion of structured data from the structured for-sale social media post.

2. The method as recited in claim 1, wherein the structured for-sale social media post comprises, in addition to the message control, one or more of a product title or name, a product description, a product location, a product model name or number, a product model year, product specifications, inventory availability, or media content associated with the product.

3. The method as recited in claim 1, further comprising maintaining, within the separate messaging application, the pre-populated electronic message as part of a communication thread between the first user and the second user.

4. The method as recited in claim 3, further comprising receiving, from the first user via the communication thread between the first user and the second user, an electronic message based on the pre-populated electronic message.

5. The method as recited in claim 4, further comprising, in response to receiving the electronic message based on the pre-populated electronic message from the first user, maintaining the communication thread between the first user and the second user as part of a list of communication threads between the second user and other users associated with the structured for-sale social media post.

6. The method as recited in claim 5, further comprising, providing, as part of the list of communication threads between the second user and other users associated with the structured for-sale social media post, a message all button.

7. The method as recited in claim 6, further comprising, in response to a detected selection of the message all button:
receiving a broadcast electronic message related to the structured for-sale social media post from the second user via the separate messaging application; and
adding the broadcast electronic message related to the structured for-sale social media post to each of the communication threads in the list of communication threads between the second user and other users associated with the structured for-sale social media post.

8. The method as recited in claim 5, further comprising:
in response to receiving the electronic message from the first user, determining that a purchase event has occurred;
generating an invoice associated with the structured for-sale social media post; and
adding the invoice to the communication thread between the first user and the second user.

9. The method as recited in claim 8, wherein generating the invoice associated with the structured for-sale social media post comprises generating the invoice with transactional language from the communication thread between the first user and the second user, and structured data from the structured for-sale social media post.

10. The method as recited in claim 9, further comprising, in response to generating the invoice associated with the structured for-sale social media post:
generating a sold notification associated with the structured for-sale social media post; and
adding the sold notification to each of the communication threads in the list of communication threads between the second user and other users associated with the structured for-sale social media post.

11. A system comprising:
at least one processor; and
at least one non-transitory computer-readable storage medium storing instructions thereon that, when executed by the at least one processor, cause the system to:
provide, within a social networking application newsfeed customized for a first user for display on a touch screen display of a mobile device, a structured for-sale social media post from a second user, the structured for-sale social media post comprising a message control;
in response to a detected selection of the message control by the first user, change a display focus of the touch screen display from the social networking application to a separate messaging application; and
provide, in response to the changed display focus, a pre-populated electronic message within the separate messaging application comprising at least a portion of structured data from the structured for-sale social media post.

12. The system as recited in claim 11, further storing instructions thereon that, when executed by the at least one processor, cause the system to maintain, within the separate messaging application, the pre-populated electronic message as part of a communication thread between the first user and the second user.

13. The system as recited in claim 12, further storing instructions thereon that, when executed by the at least one processor, cause the system to receive, from the first user via the communication thread between the first user and the second user, an electronic message based on the pre-populated electronic message.

14. The system as recited in claim 13, further storing instructions thereon that, when executed by the at least one processor, cause the system to:
in response to receiving the electronic message based on the pre-populated electronic message from the first user, maintain the communication thread between the first user and the second user as part of a list of communication threads between the second user and other users associated with the structured for-sale social media post; and
provide, as part of the list of communication threads between the second user and other users associated with the structured for-sale social media post, a message all button.

15. The system as recited in claim 14, further storing instructions thereon that, when executed by the at least one processor, cause the system to, in response to a detected selection of the message all button:
receive a broadcast electronic message related to the structured for-sale social media post from the second user via the separate messaging application; and
add the broadcast electronic message related to the structured for-sale social media post to each of the communication threads in the list of communication threads between the second user and other users associated with the structured for-sale social media post.

16. The system as recited in claim 15, further storing instructions thereon that, when executed by the at least one processor, cause the system to:
in response to receiving the electronic message from the first user, determine that a purchase event has occurred;
generate an invoice associated with the structured for-sale social media post; and
add the invoice to the communication thread between the first user and the second user.

17. The system as recited in claim 16, further storing instructions thereon that, when executed by the at least one processor, cause the system to, in response to generating the invoice associated with the structured for-sale social media post:
generate a sold notification associated with the structured for-sale social media post; and
add the sold notification to each of the communication threads in the list of communication threads between the second user and other users associated with the structured for-sale social media post.

18. A non-transitory computer-readable medium storing instructions thereon that, when executed by at least one processor, cause a computer system to:
provide, within a social networking application newsfeed customized for a first user for display on a touch screen display of a mobile device, a structured for-sale social media post from a second user, the structured for-sale social media post comprising a message control;
in response to a detected selection of the message control by the first user, change a display focus of the touch screen display from the social networking application to a separate messaging application; and
provide, in response to the changed display focus, a pre-populated electronic message within the separate messaging application comprising at least a portion of structured data from the structured for-sale social media post.

19. The non-transitory computer-readable medium as recited in claim 18, further storing instructions thereon that, when executed by the at least one processor, cause the computer system to:

maintain, within the separate messaging application, the pre-populated electronic message as part of a communication thread between the first user and the second user;

receive, from the first user via the communication thread between the first user and the second user, an electronic message based on the pre-populated electronic message; and in response to receiving the electronic message based on the pre-populated electronic message from the first user, maintain the communication thread between the first user and the second user as part of a list of communication threads between the second user and other users associated with the structured for-sale social media post.

20. The non-transitory computer-readable medium as recited in claim 19, further storing instructions thereon that, when executed by the at least one processor, cause the computer system to:

in response to receiving the electronic message from the first user, determine that a purchase event has occurred;

generate an invoice associated with the structured for-sale social media post; and add the invoice to the communication thread between the first user and the second user.

\* \* \* \* \*